(12) United States Patent
Imade

(10) Patent No.: US 7,178,923 B2
(45) Date of Patent: Feb. 20, 2007

(54) ILLUMINATION APPARATUS AND IMAGE PROJECTION APPARATUS

(75) Inventor: Shinichi Imade, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/454,530

(22) Filed: Jun. 16, 2006

(65) Prior Publication Data

US 2006/0244931 A1 Nov. 2, 2006

Related U.S. Application Data

(62) Division of application No. 11/363,715, filed on Feb. 28, 2006, which is a division of application No. 10/689,260, filed on Oct. 20, 2003.

(30) Foreign Application Priority Data

Oct. 21, 2002 (JP) ............... 2002-305962
Jun. 20, 2003 (JP) ............... 2003-177117

(51) Int. Cl.
G03B 21/20 (2006.01)
G03B 21/28 (2006.01)
G02B 6/36 (2006.01)
G02B 6/42 (2006.01)
H04N 5/70 (2006.01)
F21V 7/00 (2006.01)
F21V 21/00 (2006.01)

(52) U.S. Cl. ............... 353/102; 353/99; 362/237; 362/247; 362/249; 362/269; 362/319; 362/346; 362/555; 362/581; 385/34; 385/43; 385/133; 348/801

(58) Field of Classification Search ............ 353/102, 353/20, 29, 31, 33, 34, 37, 81, 82, 84, 85, 353/87, 94, 97–99; 362/11, 19, 27, 227, 362/237, 240, 241, 246, 247, 249, 269, 317, 362/319, 341, 346, 349, 551, 555, 558, 560, 362/561, 581, 582, 583, 800; 385/1–3, 34, 385/43, 133, 901; 359/34, 483; 348/801
See application file for complete search history.

(56) References Cited

U.S. PATENT DOCUMENTS 4,669,817 A 6/1987 Mori ............... 398/98

(Continued)

FOREIGN PATENT DOCUMENTS

JP 06082909 6/1994

(Continued)

Primary Examiner—W. B. Perkey
Assistant Examiner—Rochelle Blackman
(74) Attorney, Agent, or Firm—Volpe and Koenig, P.C.

(57) ABSTRACT

An illumination apparatus illuminating an objective illumination region comprises a plurality of illuminants having light-emitting surfaces radiating diffused light, an illuminant substrate in which the illuminants are disposed so as to be set in array on the circumference, at least one optical member configured to guide the diffused light to the objective illumination region, a movable section configured to drive the optical member so as to be rotatable around the center of the circumference serving as a rotation center, and a lighting control section configured to control a light-emitting timing of the plurality of illuminants. The movable section and the lighting control section operate together such that the quantity of light per unit time of the diffused light guided to the objective illumination region is within a predetermined range.

10 Claims, 25 Drawing Sheets

| U.S. PATENT DOCUMENTS | | | | | FOREIGN PATENT DOCUMENTS | | |
|---|---|---|---|---|---|---|---|
| 4,767,172 A | 8/1988 | Nichols et al. | 385/146 | JP | 07098416 | 4/1995 |
| 5,829,858 A | 11/1998 | Levis et al. | 353/122 | JP | 09200662 | 11/1997 |
| 5,997,150 A | 12/1999 | Anderson | 362/227 | JP | 10293233 | 11/1998 |
| 6,129,437 A | 10/2000 | Koga et al. | 353/98 | JP | 10333588 | 12/1998 |
| 6,183,100 B1 | 2/2001 | Pond et al. | 362/35 | JP | 1132278 | 2/1999 |
| 6,227,669 B1 | 5/2001 | Tiao et al. | 353/31 | JP | 11260572 | 9/1999 |
| 6,318,863 B1 | 11/2001 | Tiao et al. | 353/31 | JP | 11352589 | 12/1999 |
| 2002/0080834 A1 | 6/2002 | Kusunose | 372/25 | JP | 2000206455 | 7/2000 |
| 2002/0084951 A1 | 7/2002 | McCoy | 345/31 | JP | 2000294491 | 10/2000 |
| 2002/0186349 A1 | 12/2002 | Wichner et al. | 353/29 | JP | 2001201719 | 5/2001 |
| 2003/0076057 A1 | 4/2003 | Fleury | 315/291 | JP | 2003208991 | 7/2003 |

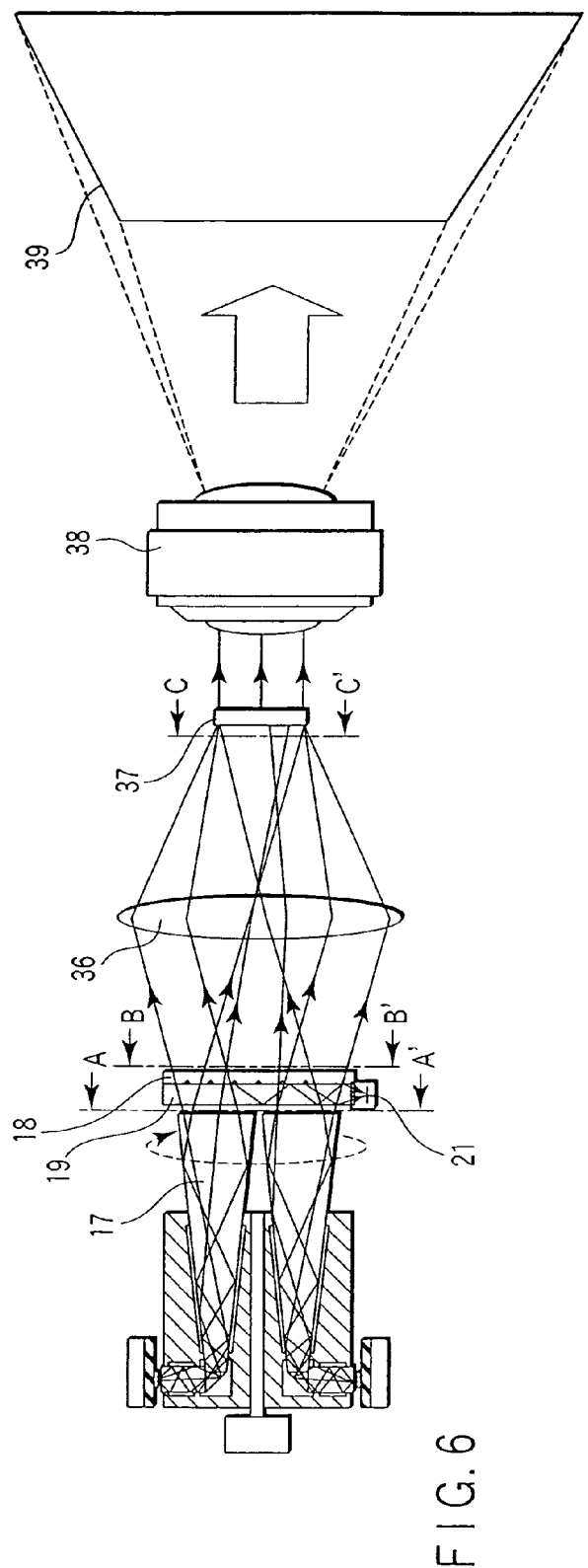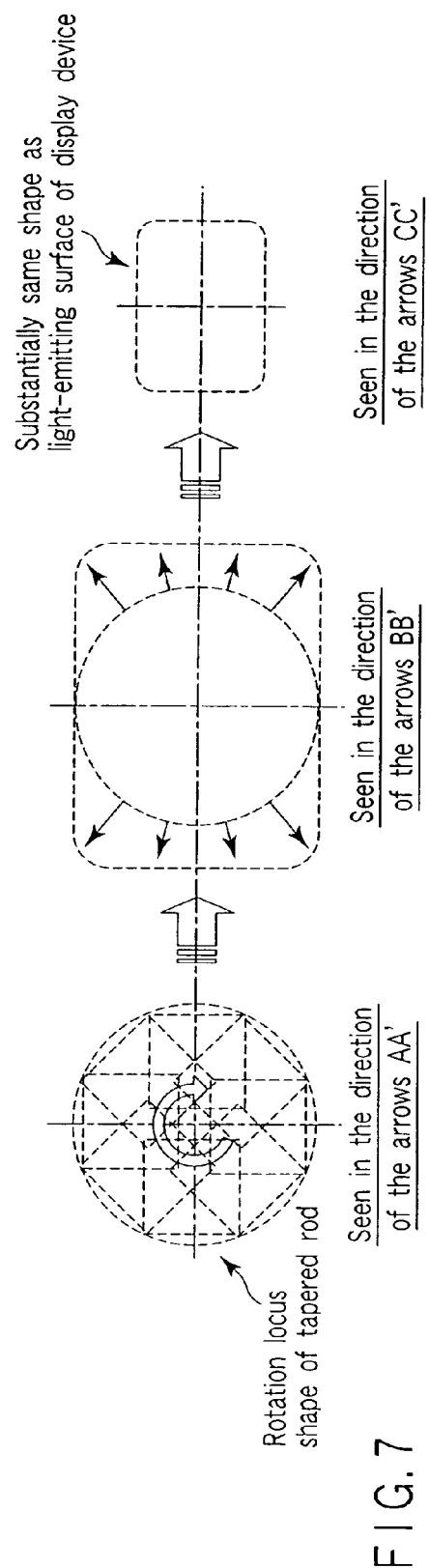
F I G. 6
F I G. 7

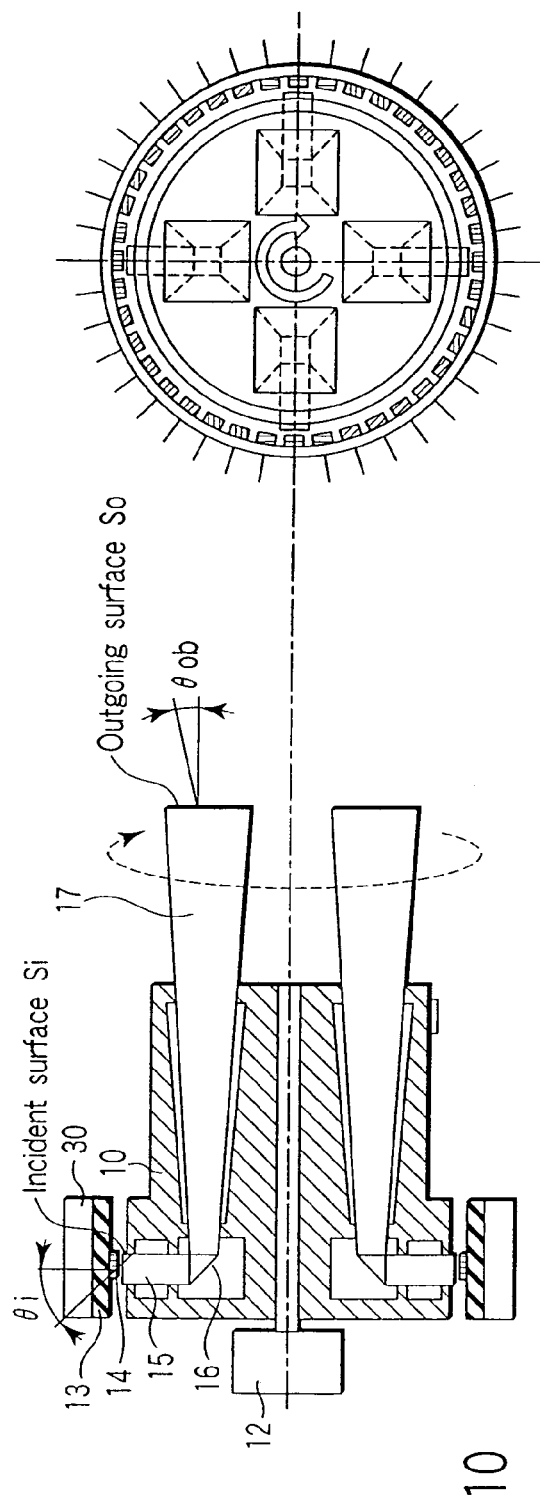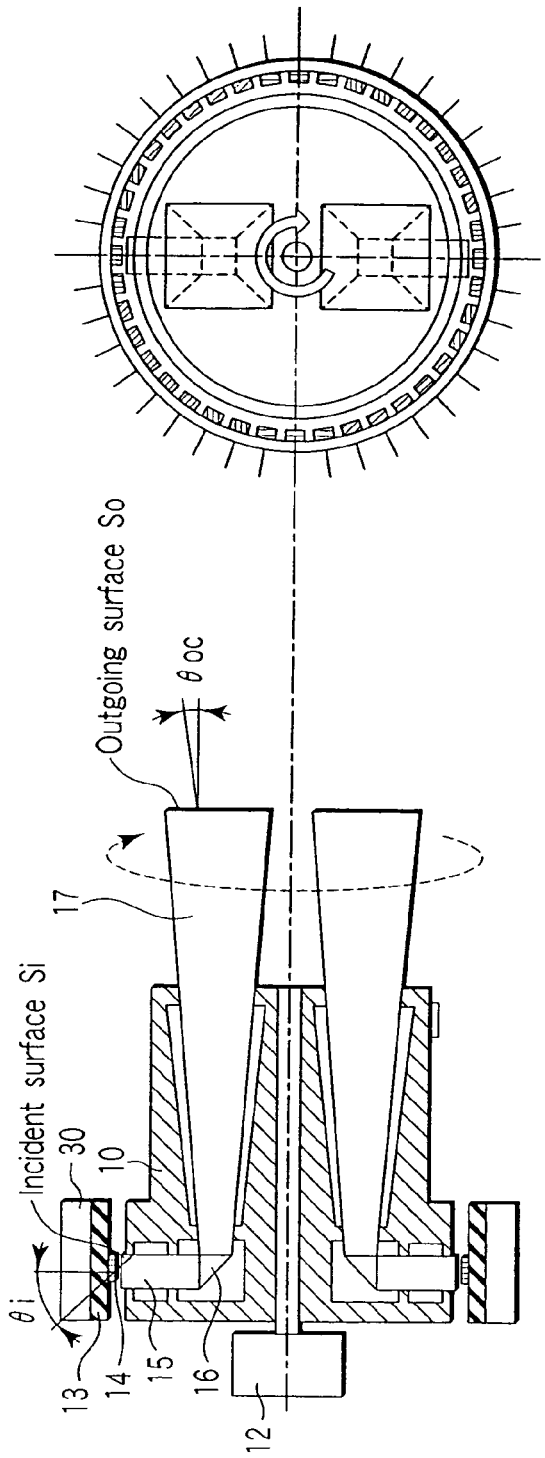
FIG. 10
FIG. 11

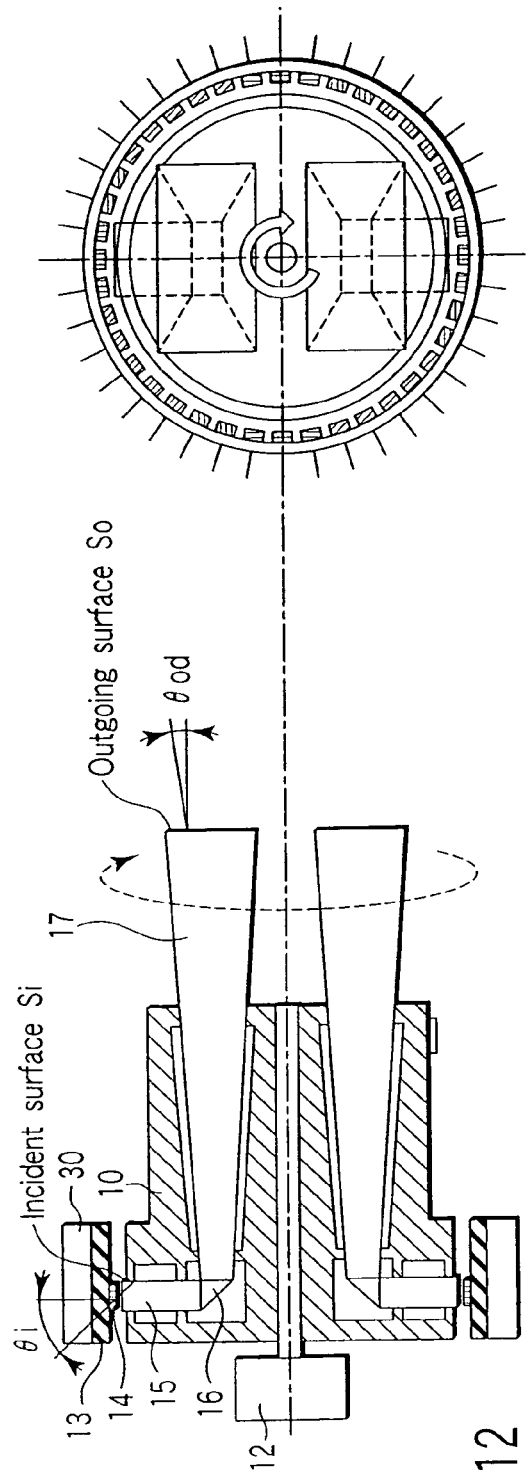

FIG. 12

| Effective order (superior→poor) | Taken-out quantity of light | Efficiency for light utilization | NA conversion efficiency | Suppression for variation in quantity of light |
|---|---|---|---|---|
| ① | Model A (FIG. 9) | Model D | Model C | Conventional model |
| ② | Model D (FIG. 12) | Model C | Model D | Model D |
| ③ | Model B (FIG. 10) | Model B | Model B | Model C |
| ④ | Model C (FIG. 11) | Model A | Model A | Model B |
| ⑤ | Conventional model (FIG. 8) | Conventional model | Conventional model | Model A |

FIG. 13

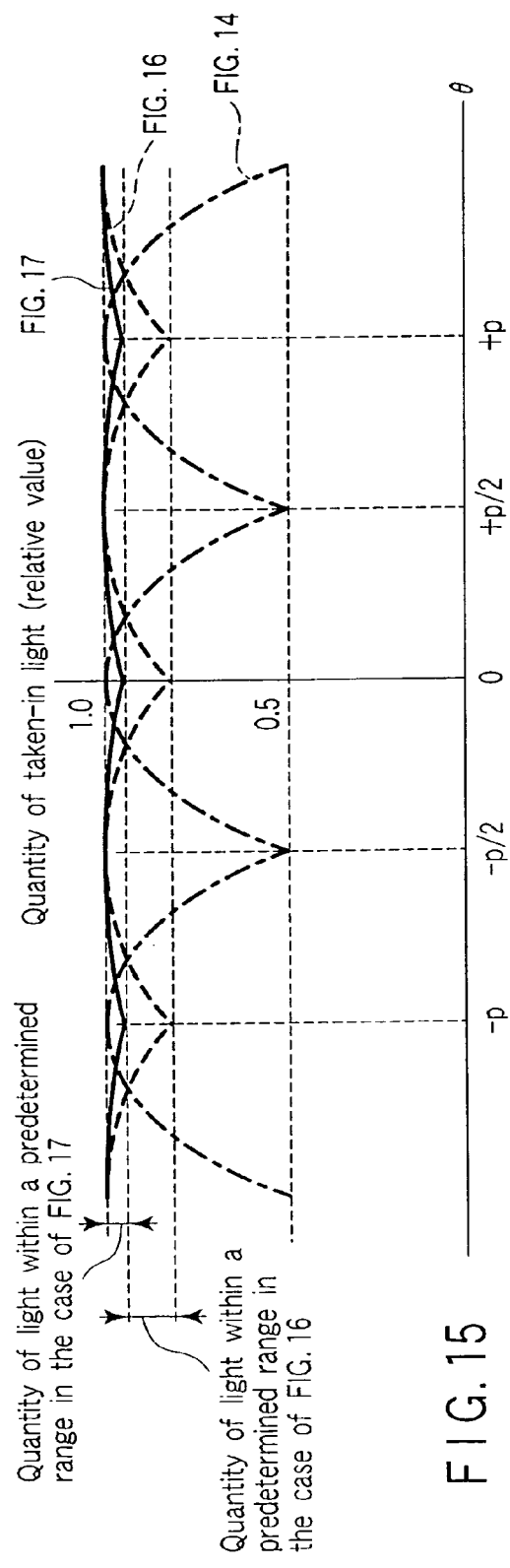
F I G. 15
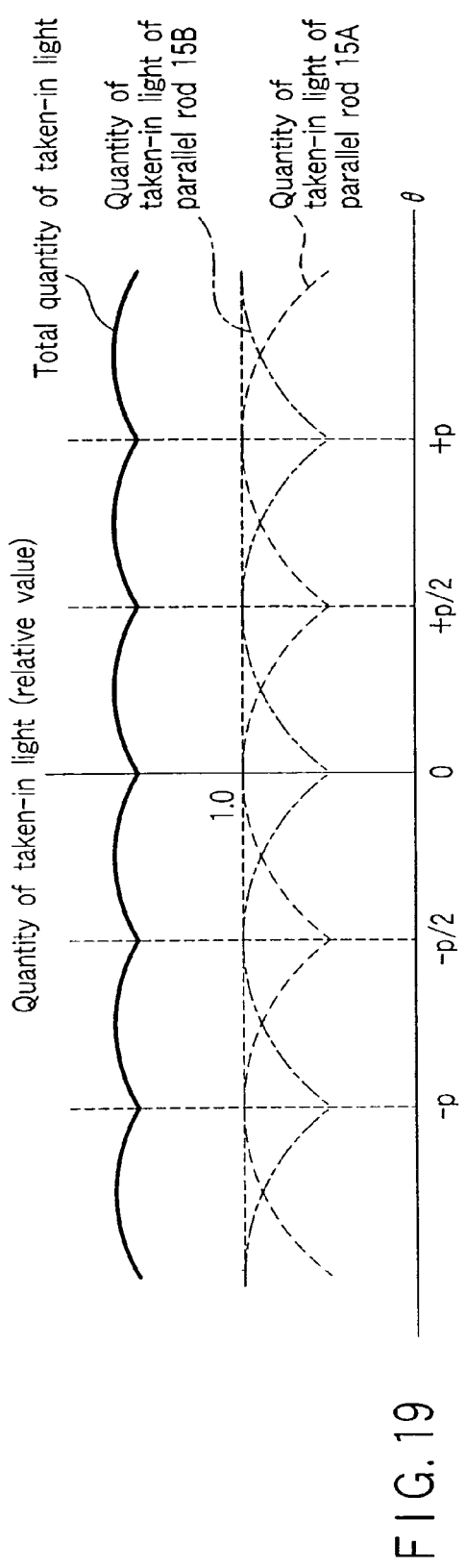
F I G. 19

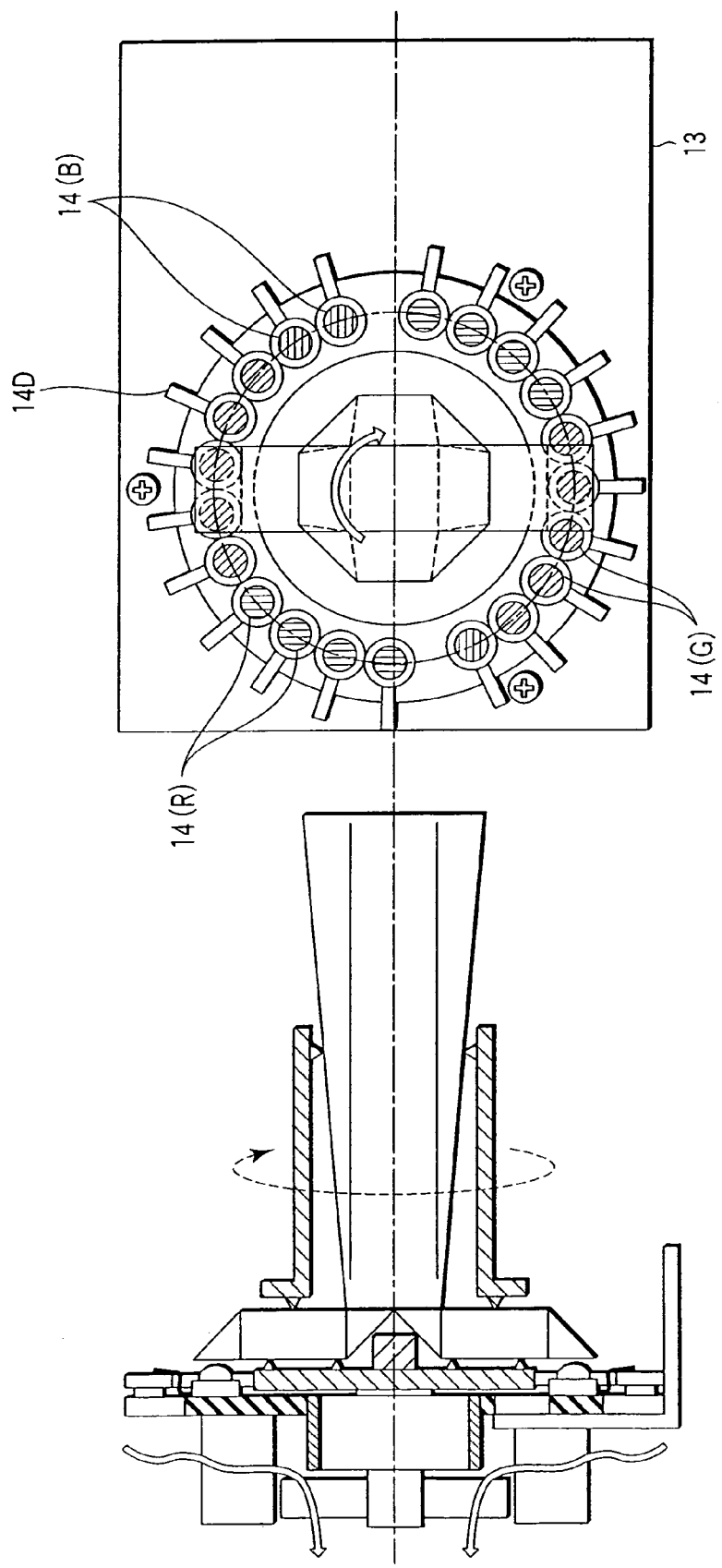
F I G. 31B

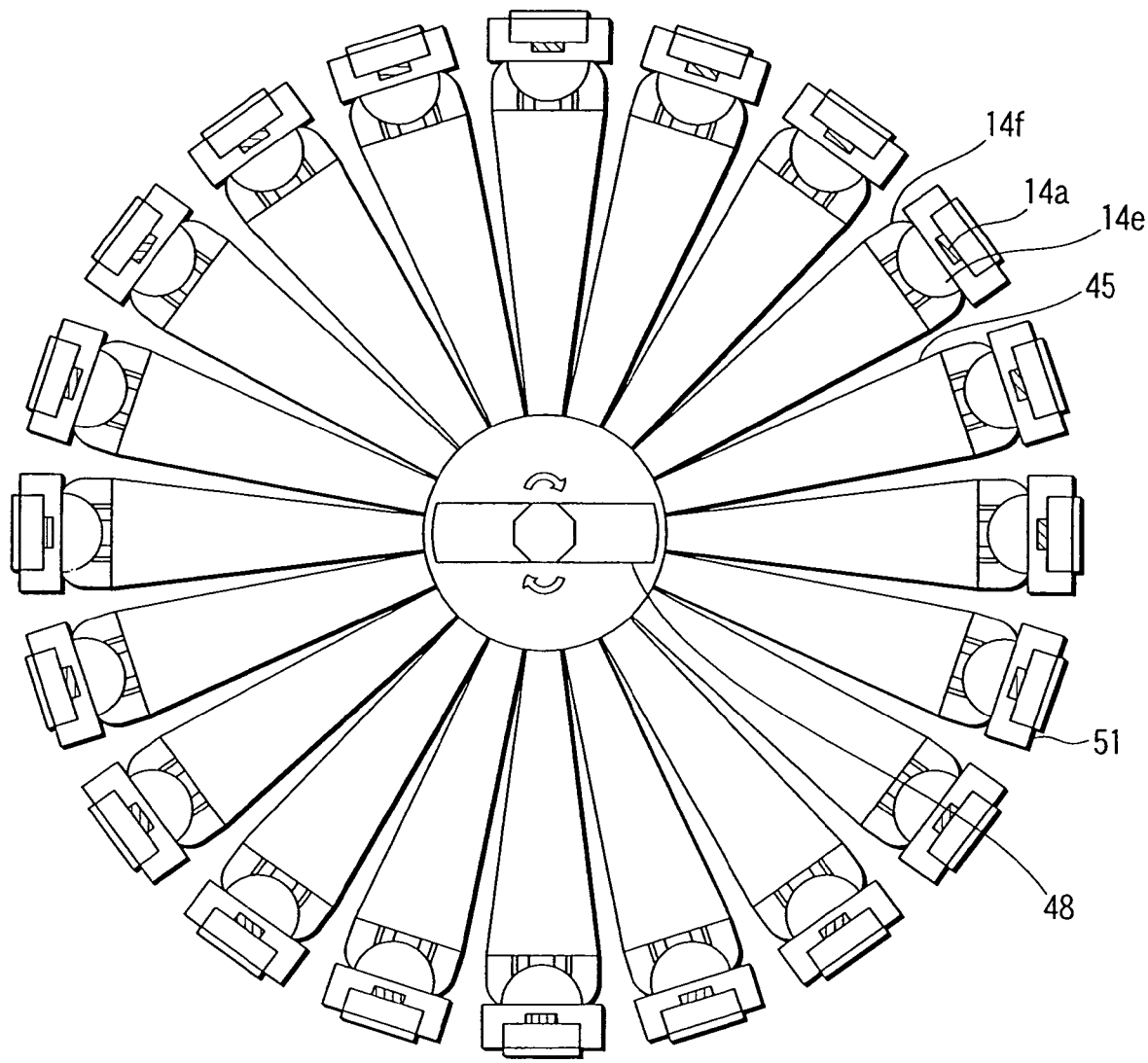
F I G. 40

ILLUMINATION APPARATUS AND IMAGE PROJECTION APPARATUS

CROSS-REFERENCE TO RELATED APPLICATIONS

This application is a division of U.S. patent application Ser. No. 11/363,715, filed on Feb. 28, 2006, which is a division of U.S. patent application Ser. No. 10/689,260, filed on Oct. 20, 2003, which is based upon and claims the benefit of priority from Japanese Patent Application No. 2002-305962, filed Oct. 21, 2002, and Japanese Patent Application No. 2003-177117, filed Jun. 20, 2003, the entire contents of which are incorporated herein by reference as if fully set forth.

BACKGROUND OF THE INVENTION

1. Field of the Invention

The present invention relates to an illumination apparatus in which the light-condensing performance thereof is high and which is high-intensity and compact, and to an image projection apparatus using such an illumination apparatus.

2. Description of the Related Art

Conventionally, as a light-condensing illumination apparatus efficiently illuminating a specific place, for example, a vehicle headlamp, a floodlight, a spotlight, a flashlight, an illumination unit for a data projector, and the like have been known. In the light-condensing illumination apparatus, generally, an attempt is made to effectively carry out condensing illumination by a relatively simple method in which a light-emitting source which is relatively more similar to a point light source is reflected by a reflecting unit in which the reflecting shape thereof is contrived, and the directivity of luminous flux of the reflected light is improved by an optical lens or the like.

In the same way as in the general illumination, in these light-condensing illumination apparatuses as well, the demand that a size of the apparatus itself is not especially made large, and the light-condensing performance is improved, and an attempt is made to obtain even brighter illumination light is high. However, generally, there is the trend that the size of the light-condensing illumination apparatus is made large in order to obtain the even brighter illumination light. In particular, output power is enhanced due to applied electric power of a light-emitting source being made large, or a reflecting unit or an optical lens which is relatively enlarged is applied to the light-emitting source in order to improve the light-condensing performance thereof. Accordingly, in order to obtain brightness at a high light-condensing efficiency, the size of the illumination apparatus must be necessarily larger with respect to the light-emitting source. In other words, provided that there is a compact light-emitting source which outputs high power and which is similar to a point light source, the entire illumination apparatus can be made compact. In accordance with such a demand, making a conventional system light-emitting source compact has been developed, and in particular, an electric-discharging type compact light-emitting source which can output high power is presently advantageous means. However, there are a large number of problems such that even a compact electric-discharging type light-emitting source requires to be driven by a high voltage power supply in which it is difficult to make the circuit dimensions small, or the like, for making an entire illumination apparatus compact, and it is said that the method in which an entire illumination apparatus is made compact substantially realize limit.

On the other hand, as the next-generation compact light-emitting source, a light emitting diode (hereinafter, referred to as LED) has been recently markedly focused on. Up to the present, although the LED has merits such as a compactness, high resistance, a long life, or the like, the major applications are for using as a indicator illumination for various meters and a confirming lamp in a control state due to the limitations of the light-emitting efficiency and the light-emitting output. However, in recent years, the light-emitting efficiency has been being rapidly improved, and it has been said that the light-emitting efficiency of the LED exceeds the light-emitting efficiency of an electric-discharging type high-pressure mercury lamp and a fluorescent lamp which have been conventionally considered as the highest efficiency, is only a question of time. In accordance with an appearance of the high-efficiency and high-intensity LED, a high power light-emitting source by the LED has been rapidly close to be realized. Further, the application of the LED has been accelerated by the fact that the stage of practical use for the blue LED in addition to the conventional red and green LEDs is recently achieved. In reality, due to the plurality of high-efficiency and high-intensity LEDs being used, putting the LEDs to practical use for traffic lights, an outdoor type large full color display, various lamps of an automobile, a back light of liquid-crystal display of a cellular phone, has been started.

As a promising compact light-emitting source of an illumination apparatus for which light-condensing performance is required as well, it is considered that the high-efficiency and high-intensity LED is applied. The LED originally has characteristics superior than the other light-emitting sources in the points of a life, durability, a lighting speed, simplicity of a lighting driving circuit. In particular, the applicable range as a full color image display apparatus is enlarged due to three primary colors being completed as a light-emitting source emitting light by itself due to blue color being added. As a typical example of the illumination apparatus for which light-condensing performance is required, for example, there is a projector display apparatus (image projection apparatus) in which a display image is formed from image data, and the display image is projected. In a conventional image projector apparatus, desired primary colors are separated from a white system light-emitting source by a color filter or the like, and space light modulation is applied to image data corresponding to each color, and color image display has been able to be realized due to the image data being three-dimensionally and temporally synthesized. When the white system light-emitting source is used, because only one desired color is separated and used, there are a large number of cases in which colors other than the separated color are wastefully thrown away. In this point, because the LED emits the desired light itself, it is possible to emit a required quantity of light as needed, and it is possible to efficiently utilize the light of the light-emitting source without light being wasted as compared with the case of the conventional white system light-emitting source.

Focusing on such superior applicable conditions of the LED, examples in which the LED is applied to an illumination apparatus for an image projection apparatus are disclosed in, for example, Jpn. Pat. Appln. KOKAI Publication No. 11-32278, U.S. Pat. No. 6,227,669B1, U.S. Pat. No. 6,318,863, or the like. In the technique disclosed in these publications, a certain quantity of light is insured by structuring a plurality of LEDs, and some of luminous flux from the individual light-emitting sources are condensed by an optical element such as an optical lens or the like, and the luminous flux is controlled so as to be successfully within an incident angle allowed by a light-modulating element irradiating the light. In an optical modulating element such as a liquid crystal device which is generally and broadly used, because an incident angle allowed as illumination light is extremely small, it is considered as an ideal, not only to have mere light-condensing performance, but also to form a luminous flux having a higher parallelism and irradiate the luminous flux. This is markedly important point from the standpoint in which efficiency for light utilization in an optical modulating element is improved.

As such light-condensing means for guiding the outgoing light from the LED to a predetermined direction, for example, a specific shaped prism is proposed in U.S. Pat. No. 4,767,172.

BRIEF SUMMARY OF THE INVENTION

According to a first aspect of the present invention, there is provided an illumination apparatus illuminating an objective illumination region, comprising:

a plurality of illuminants having light-emitting surfaces radiating diffused light;

an illuminant substrate in which the illuminants are disposed so as to be set in array on the circumference;

at least one optical member configured to guide the diffused light to the objective illumination region;

a movable section configured to drive the optical member so as to be rotatable around the center of the circumference serving as a rotation center; and a lighting control section configured to control a light-emitting timing of the plurality of illuminants, wherein the movable section and the lighting control section operate together such that the quantity of light per unit time of the diffused light guided to the objective illumination region is within a predetermined range.

According to a second aspect of the present invention, there is provided an illumination apparatus illuminating an objective illumination region, comprising:

a plurality of illuminants having light-emitting surfaces radiating diffused light;

an illuminant substrate in which the illuminants are disposed so as to be set in array on the circumference;

at least one optical member configured to guide the diffused light to the objective illumination region;

a movable section configured to drive the plurality of optical member so as to be rotatable around the center of the circumference serving as a rotation center; and a lighting control section configured to control a light-emitting timing of the plurality of illuminants, wherein the movable section and the lighting control section operate together such that an area of the light-emitting surface emitting the diffused light for the light guided to the illumination region is within a predetermined range in variations in time.

According to a third aspect of the present invention, there is provided an illumination apparatus illuminating an objective illumination region, comprising:

a plurality of illuminants having light-emitting surfaces radiating diffused light;

an illuminant substrate in which the illuminants are disposed so as to be set in array on the circumference;

a plurality of optical member which each have incident end surfaces and outgoing end surfaces, and which are configured to radiate the diffused light incident from the incident end surfaces and guide the diffused light to the objective illumination region;

a movable section configured to drive the optical member so as to be rotatable around the center of the circumference serving as a rotation center; and a lighting control section configured to control a light-emitting timing of the plurality of illuminants, wherein the respective outgoing end surfaces of the plurality of optical member are in rotation symmetrical relationship with respect to the center of the circumference.

According to a fourth aspect of the present invention, there is provided an image projection apparatus comprising:

an illumination apparatus configured to illuminate an objective illumination region, the illumination apparatus including:

a plurality of illuminants having light-emitting surfaces radiating diffused light;

an illuminant substrate in which the illuminants are disposed so as to be set in array on the circumference;

at least one optical member configured to guide the diffused light to the objective illumination region;

a movable section configured to drive the optical member so as to be rotatable around the center of the circumference serving as a rotation center; and a lighting control section configured to control a light-emitting timing of the plurality of illuminants, wherein the movable section and the lighting control section operate together such that the quantity of light per unit time of the diffused light guided to the objective illumination region is within a predetermined range;

a display device disposed at an objective irradiation region of the illumination apparatus; and a projection lens configured to project an image formed at the display device on a screen.

According to a fifth aspect of the present invention, there is provided an image projection apparatus comprising:

an illumination apparatus configured to illuminate an objective illumination region, the illumination apparatus including:

a plurality of illuminants having light-emitting surfaces radiating diffused light;

an illuminant substrate in which the illuminants are disposed so as to be set in array on the circumference;

at least one optical member configured to guide the diffused light to the objective illumination region;

a movable section configured to drive the plurality of optical member so as to be rotatable around the center of the circumference serving as a rotation center; and a lighting control section configured to control a light-emitting timing of the plurality of illuminants, wherein the movable section and the lighting control section operate together such that an area of the light-emitting surface emitting the diffused light for the light guided to the illumination region is within a predetermined range in variations in time;

a display device disposed at an objective irradiation region of the illumination apparatus; and a projection lens configured to project an image formed at the display device on a screen.

According to a sixth aspect of the present invention, there is provided an image projection apparatus comprising:

an illumination apparatus configured to illuminate an objective illumination region, the illumination apparatus including:

a plurality of illuminants having light-emitting surfaces radiating diffused light;

an illuminant substrate in which the illuminants are disposed so as to be set in array on the circumference;

a plurality of optical member which each have incident end surfaces and outgoing end surfaces, and which are configured to radiate the diffused light incident from the incident end surfaces and guide the diffused light to the objective illumination region;

a movable section configured to drive the optical member so as to be rotatable around the center of the circumference serving as a rotation center; and a lighting control section configured to control a light-emitting timing of the plurality of illuminants, wherein the respective outgoing end surfaces of the plurality of optical member are in rotation symmetrical relationship with respect to the center of the circumference;

a display device disposed at an objective irradiation region of the illumination apparatus; and a projection lens configured to project an image formed at the display device on a screen.

According to a seventh aspect of the present invention, there is provided an illumination apparatus illuminating an objective illumination region, comprising:

a plurality of illuminants having light-emitting surfaces radiating diffused light; and a plurality light guiding prisms disposed in the vicinity of the illuminant in the positional relationship so as to be point symmetrical with respect to the center of the illuminant, wherein the light guiding prism includes:

an incident surface configured to make the outgoing light from the illuminant be incident;

a reflecting surface configured to reflect the light incident from the incident surface and guiding the light in the prism to a predetermined direction; and an outgoing surface configured to radiate the light guided at the reflecting surface.

According to an eighth aspect of the present invention, there is provided an illumination apparatus illuminating an objective illumination region, comprising:

a plurality of illuminants having light-emitting surfaces radiating diffused light;

an illuminant substrate in which the illuminants are disposed so as to be set in array on the circumference;

at least one optical means for guiding the diffused light to the objective illumination region;

movable means for driving the optical means so as to be rotatable around the center of the circumference serving as a rotation center; and lighting control means for controlling a light-emitting timing of the plurality of illuminants, wherein the movable means and the lighting control means operate together such that the quantity of light per unit time of the diffused light guided to the objective illumination region is within a predetermined range.

According to a ninth aspect of the present invention, there is provided an illumination apparatus illuminating an objective illumination region, comprising:

a plurality of illuminants having light-emitting surfaces radiating diffused light;

an illuminant substrate in which the illuminants are disposed so as to be set in array on the circumference;

at least one optical means for guiding the diffused light to the objective illumination region;

movable means for driving the plurality of optical means so as to be rotatable around the center of the circumference serving as a rotation center; and lighting control means for controlling a light-emitting timing of the plurality of illuminants, wherein the movable means and the lighting control means operate together such that an area of the light-emitting surface emitting the diffused light for the light guided to the illumination region is within a predetermined range in variations in time.

According to a tenth aspect of the present invention, there is provided an illumination apparatus illuminating an objective illumination region, comprising:

a plurality of illuminants having light-emitting surfaces radiating diffused light;

an illuminant substrate in which the illuminants are disposed so as to be set in array on the circumference;

a plurality of optical means which each have incident end surfaces and outgoing end surfaces, and which are for radiating the diffused light incident from the incident end surfaces and guiding the diffused light to the objective illumination region;

movable means for driving the optical means so as to be rotatable around the center of the circumference serving as a rotation center; and lighting control means for controlling a light-emitting timing of the plurality of illuminants, wherein the respective outgoing end surfaces of the plurality of optical means are in rotation symmetrical relationship with respect to the center of the circumference.

According to an eleventh aspect of the present invention, there is provided an image projection apparatus comprising:

an illumination apparatus for illuminating an objective illumination region, the illumination apparatus including:

a plurality of illuminants having light-emitting surfaces radiating diffused light;

an illuminant substrate in which the illuminants are disposed so as to be set in array on the circumference;

at least one optical means for guiding the diffused light to the objective illumination region;

movable means for driving the optical means so as to be rotatable around the center of the circumference serving as a rotation center; and lighting control means for controlling a light-emitting timing of the plurality of illuminants, wherein the movable means and the lighting control means operate together such that the quantity of light per unit time of the diffused light guided to the objective illumination region is within a predetermined range;

a display device disposed at an objective irradiation region of the illumination apparatus; and a projection lens for projecting an image formed at the display device on a screen.

According to a twelfth aspect of the present invention, there is provided an image projection apparatus comprising:

an illumination apparatus for illuminating an objective illumination region, the illumination apparatus including:

a plurality of illuminants having light-emitting surfaces radiating diffused light;

an illuminant substrate in which the illuminants are disposed so as to be set in array on the circumference;

at least one optical means for guiding the diffused light to the objective illumination region;

movable means for driving the plurality of optical means so as to be rotatable around the center of the circumference serving as a rotation center; and lighting control means for controlling a light-emitting timing of the plurality of illuminants, wherein the movable means and the lighting control means operate together such that an area of the light-emitting surface emitting the diffused light for the light guided to the illumination region is within a predetermined range in variations in time;

a display device disposed at an objective irradiation region of the illumination apparatus; and a projection lens for projecting an image formed at the display device on a screen.

According to a thirteenth aspect of the present invention, there is provided an image projection apparatus comprising:

an illumination apparatus for illuminating an objective illumination region, the illumination apparatus including:

a plurality of illuminants having light-emitting surfaces radiating diffused light;

an illuminant substrate in which the illuminants are disposed so as to be set in array on the circumference;

a plurality of optical means which each have incident end surfaces and outgoing end surfaces, and which are for radiating the diffused light incident from the incident end surfaces and guiding the diffused light to the objective illumination region;

movable means for driving the optical means so as to be rotatable around the center of the circumference serving as a rotation center; and lighting control means for controlling a light-emitting timing of the plurality of illuminants, wherein the respective outgoing end surfaces of the plurality of optical means are in rotation symmetrical relationship with respect to the center of the circumference;

a display device disposed at an objective irradiation region of the illumination apparatus; and a projection lens for projecting an image formed at the display device on a screen.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 6 is a diagram showing a structure of an image projection apparatus using the illumination apparatus according to the first embodiment of the present invention;

FIG. 7 is a diagram showing front views as seen in the direction of the arrows, for explanation of luminous flux shapes taken along AA' line, BB' line, and CC' line of the image projection apparatus of FIG. 6;

FIG. 10 is a diagram showing a structure of an illumination apparatus (model B), which is an efficiency for light utilization prior type, according to the second embodiment;

FIG. 11 is a diagram showing a structure of an illumination apparatus (model C), which is an NA conversion efficiency prior type, according to the second embodiment;

FIG. 12 is a diagram showing a structure of an illumination apparatus (model D), which is a light quantity variation suppression and NA conversion efficiency prior type, according to the second embodiment;

FIG. 13 is a diagram showing a table in which evaluations of the characteristics of the conventional model, model A, model B, model C, and model D are compared with each other;

FIG. 15 is a graph for explanation of a state of the variations in quantity of light in the illumination apparatus of FIG. 14, FIG. 16, and FIG. 17;

FIG. 19 is a graph for explanation of a state of suppressing variations in quantity of light in FIG. 18 or FIG. 20;

FIG. 31B is a diagram showing a structure of the modified example of the illumination apparatus according to the eighth embodiment;

FIG. 40 is a diagram seen from the direction of X of FIG. 38.

DETAILED DESCRIPTION OF THE INVENTION

Hereinafter, embodiments of the present invention will be described with reference to the drawings.

First Embodiment

Figure 1:
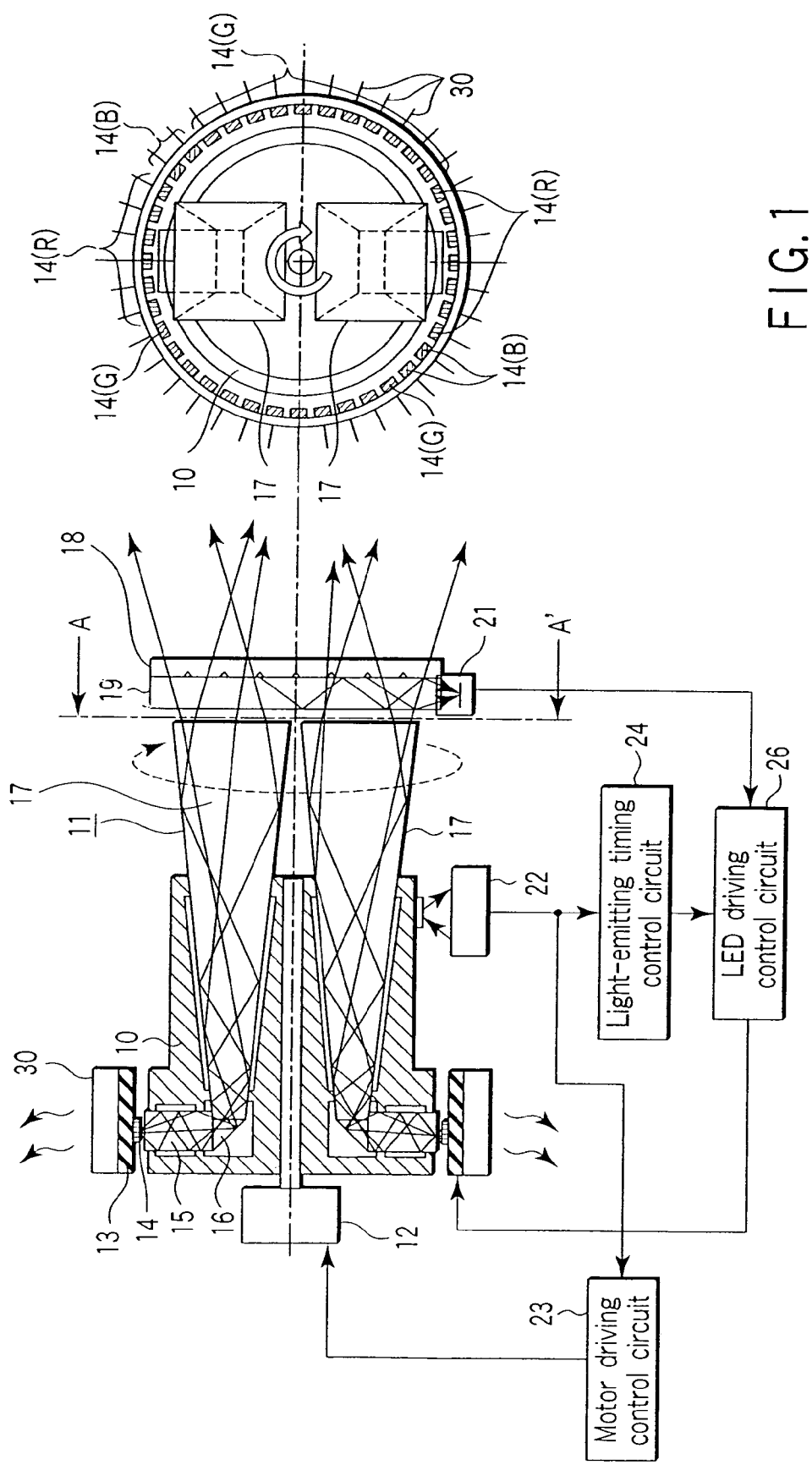
FIG. 1 is a diagram showing a structure of an illumination apparatus according to a first embodiment of the present invention.
Figure 2:
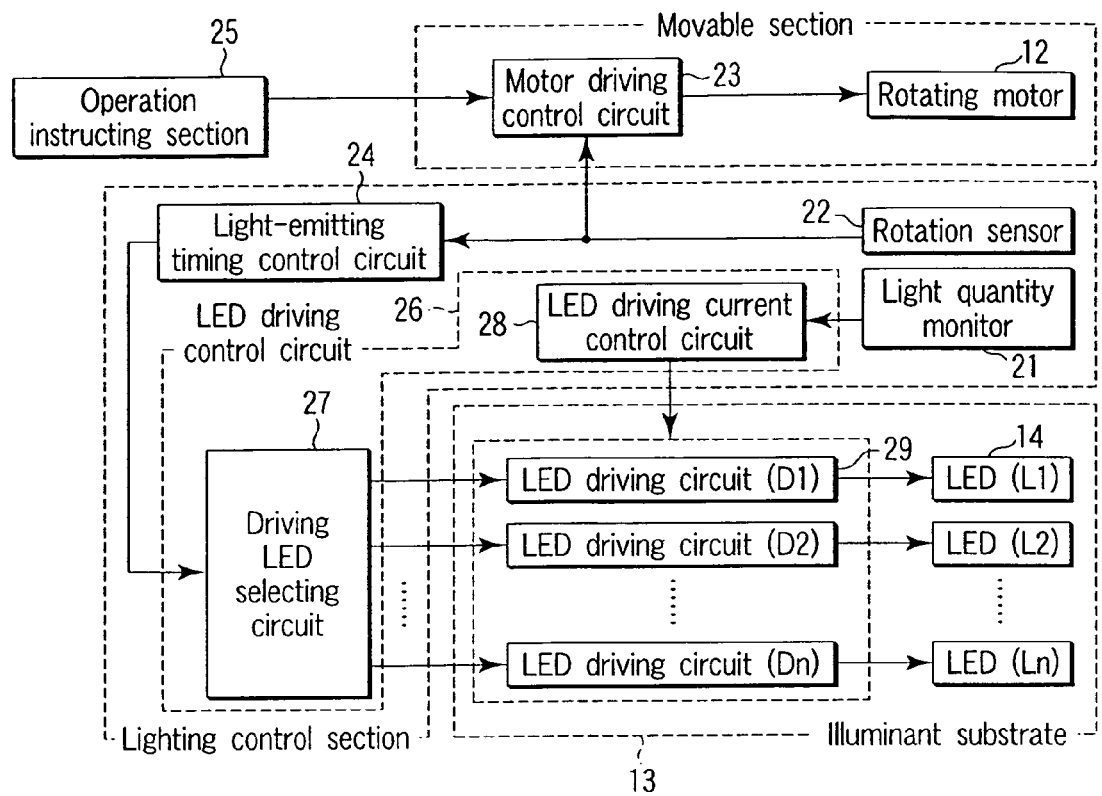
FIG. 2 is a block diagram showing an electrical structure of the illumination apparatus according to the first embodiment.

As shown in FIG. 1 and FIG. 2, in an illumination apparatus according to the present embodiment, a light guiding rod member 11 serving as a square-shaped optical member formed from an L-shaped optical surface attached to a rod holder 10 serving as a rotatable holder is rotated by a rotating motor 12 serving as a driving section, and a plurality of LEDs 14 serving as illuminants arranged at the inner circumference of an illuminant substrate 13 formed in a drum shape are successively lit in accordance with rotation of the light guiding rod member 11.

Note that the reason that the light guiding rod member 11 is made to be a square shape is that an efficiency is high in the case of being close to the shape because the LED 14 is a rectangle, and loss when the light guiding rod member 11 is bent in a L shape is suppressed to the minimum. Further, the material of the light guiding rod member 11 is a transparent glass or resin with respect to the a wavelength range of an illumination luminous flux, and the light guiding rod member 11 is structured from an optical surface whose entire surface is processed so as to be a mirror surface in order to guide light by total reflection at the side surface from the standpoint of efficiency. Here, the L-shaped light guiding rod member 11 may be integrally manufactured, and as shown in FIG. 1, the L-shaped light guiding rod member 11 may be formed due to three parts of a prismatic parallel rod 15, a reflecting prism 16 in which a reflective coating is applied on a slope for refracting an optical path, and a tapered rod 17, being connected to one another. Note that, when the light guiding rod member 11 is formed by connecting the three parts, there is no need for the refractive indices of the respective members of the parallel rod 15, the reflecting prism 16, and the tapered rod 17, to be the same refractive index. Here, the case in which the refractive index of the reflecting prism 16 is higher than the refractive indices of the parallel rod 15 and the tapered rod 17 is more preferable because the light leaked from the side surfaces of the members is little in the case. The reason for this is that a ray having an angle which is not reflected, but is permeated at the side surface of the parallel rod 15 or the tapered rod 17, among the ray which passed through the reflecting prism 16, can be reflected to the interior of the reflecting prism 16 at the connecting surface between the parallel rod 15 and the reflecting prism 16 or at the connecting surface between the tapered rod 17 and the reflecting prism 16, and as a result, the light leaked from the side surfaces of the members can be reduced.

Note that, here, a predetermined number of the LEDs 14 having luminescent colors of red (R), green (G), and blue (B) are each made to be one set, and two of the sets are arranged at the inner circumference of the drum-shaped illuminant substrate 13. Note that, in FIG. 1, differences in the respective luminescent colors of the LEDs 14 are expressed by making the hatchings thereof different. Accordingly, portions shown by hatchings with respect to the LEDs do not show the cross-sections thereof (in the other drawings as well, the hatchings denoted to the LEDs are the same).

Further, in the illumination apparatus having such a structure, an unillustrated objective illumination region is illuminated by an outgoing end surface of the light guiding rod member 11 serving as a virtual light source. Further, in particular, in the present embodiment, in order to reduce unevenness in angles, a beam reshaping diffuser (hereinafter, referred to as LSD (LSD is the registered trademark in the USA)) 18 serving as a luminous flux shape transforming element is disposed at the following stage of the outgoing end surface of the light guiding rod member 11.

Figure 3:
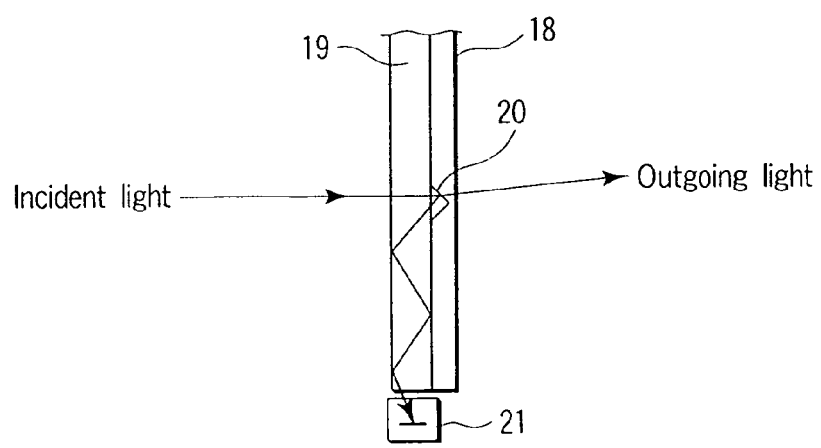
FIG. 3 is a diagram showing an example of a structure of a light guiding plate.

Further, as shown in FIG. 3, a light guiding plate 19 and a plurality of microreflecting prisms 20 are disposed in the vicinity of the outgoing end of the light guiding rod member 11, for example, at the front surface of the LSD 18. In accordance with this structure, outgoing light from the light guiding rod member 11, i.e., the rays incident to the microreflecting prisms 20 among the incident rays incident to the light guiding plate 19 are partially reflected by the microreflecting prisms 20, and the remaining rays are emitted as outgoing light via the LSD 18. The reflected light by the microreflecting prisms 20 is guided to a light quantity monitor 21 by the light guiding plate 19, and the quantity of light is detected by the light quantity monitor 21.

Moreover, a rotation sensor 22 for detecting a rotational position of the rod holder 10 is disposed at a position in the vicinity of the side surface of the rode holder 10. As the rotation sensor 22, for example, a photo reflector is used, and a sensor which detects one rotation of the rod holder 10 by detecting of the light reflected by the reflector stuck on the side surface of the rod holder 10 can be used. A rotational position detecting signal by the rotation sensor 22 is input to a motor driving control circuit 23 and an light-emitting timing control circuit 24.

Here, the motor driving control circuit 23 controls the rotating motor 12, and structures a movable section driving the light guiding rod member 11 so as to be rotatable, along with the rotating motor 12. Namely, when an operation start signal is input from an operation instructing section 25 in accordance with a button operation by the user or the like, the motor driving control circuit 23 makes rotation of the rotating motor 12 start, and drives and controls such that the rotating motor 12 rotates at a constant speed in accordance with the rotational position detected result of the rod holder 10 by the rotation sensor 22.

Further, the light-emitting timing control circuit 24 structures a lighting control section controlling a light-emitting timing of the plurality of LEDs 14, along with the light quantity monitor 21, the rotation sensor 22, and an LED driving control circuit 26 to which a light quantity detected result by the light quantity monitor 21 is input. Note that the LED driving control circuit 26 is formed from a driving LED selecting circuit 27 and an LED driving current control circuit 28. Namely, the light-emitting timing control circuit 24 generates a timing signal on the basis of detection of the rotational position of the rod holder 10 by the rotation sensor 22, and inputs the timing signal to the driving LED selecting circuit 27 of the LED driving control circuit 26. The driving LED selecting circuit 27 controls such that the LEDs 14 which are positioned at the incident surface of the light guiding rod member 11, i.e., at the incident surface position of the parallel rod 15, are successively lit by selectively providing a driving control signal to respective LED driving circuits 29 for driving the respective LEDs 14 mounted on the illuminant substrate 13 in accordance with the input timing signal. A driving current of the LED 14 by the LED driving circuit 29 at this time is controlled, by the LED driving current control circuit 28 of the LED driving control circuit 26, such that an quantity of emitted light of the LED 14 is made optimum in accordance with an increase or a decrease in the quantity of outgoing light detected by the light quantity monitor 21.

Note that a radiating plate 30 is provided at the outer circumference of the drum shaped illuminant substrate 13, and by radiating heat generated in accordance with light-emitting of the LED 14, variations in the characteristic of the LED 14 due to heat are prevented, and even if the illumination apparatus is continuously operated, stable illumination is obtained.

In this way, due to the plurality of LEDs 14 being pulse-emitted while being successively switched, and due to the relative positional relationship with the light guiding rod member 11 taking in radiated light being displaced while selecting an LED 14 in accordance with switching of light-emitting of the LEDs 14, a color of light which is emitted is switched in order of red (R), blue (B), green (G), red (R), blue (B), and green (G), in a process in which the light guiding rod member 11 rotates once, and three colors of high-intensity LEDs are effectively obtained, and a large quantity of three color lights in which the parallelisms thereof are improved are obtained from the outgoing end surface of the light guiding rod member 11. Note that the order of the luminescent colors is not limited to the above order, and may be appropriately set.

Note that, in this structure, the relative positional displacement of the LED 14 and the light guiding rod member 11 is carried out by making the light guiding rod member 11 rotate. However, the relative positional displacement of the LED 14 and the light guiding rod member 11 can also be achieved by moving the LEDs 14. However, from the standpoint of feeding power to the LED 14, moving the light guiding rod member 11 is preferable. In this case, for example, because unevenness in a light-intensity distribution in the outgoing end surface of the light guiding rod member 11 is little if the light guiding rod member 11 has a certain measure of length, the outgoing end surface can be considered as a virtual rectangular top surface light source in which the uniformity coefficient thereof is high. Therefore, a critical illumination may be carried out in which an illumination is carried out due to the objective illumination region and the outgoing end surface of the light guiding rod member 11 being made to be a conjugate relationship. However, when there are the plurality of light guiding rod members 11 as in the present structure, because the illumination is carried out such that the periphery portions of the outgoing end surfaces of the respective light guiding rod members 11 are projected on the objective illumination region, unevenness arises. In a practical sense, because the light guiding rod members 11 rotate, the illumination region is a circular, and the peripheral portion cannot be recognized as seen in some cases of a rotational speed. However, in a given moment, the peripheral portion of the rod outgoing end surface has illumination unevenness, and at times, the illumination unevenness is displaced moment by moment within the region. Therefore, when an attempt is made to structure an image projection apparatus due to a display device being disposed at the objective illumination region, the critical illumination cannot be applied to a display device which carries out gradation expression by time sharing. In contrast, in the case of the Koehler illumination in which an angular strength distribution of the luminous flux emitted from the light guiding rod member 11 is converted into a positional strength distribution at the objective illumination region, when the light guiding rod member 11 is displaced, because the angular strength distribution of the luminous flux emitted from the light guiding rod member 11 does not vary, an illumination apparatus in which unevenness in illumination at the objective illumination region is little can be achieved.

Figure 4:
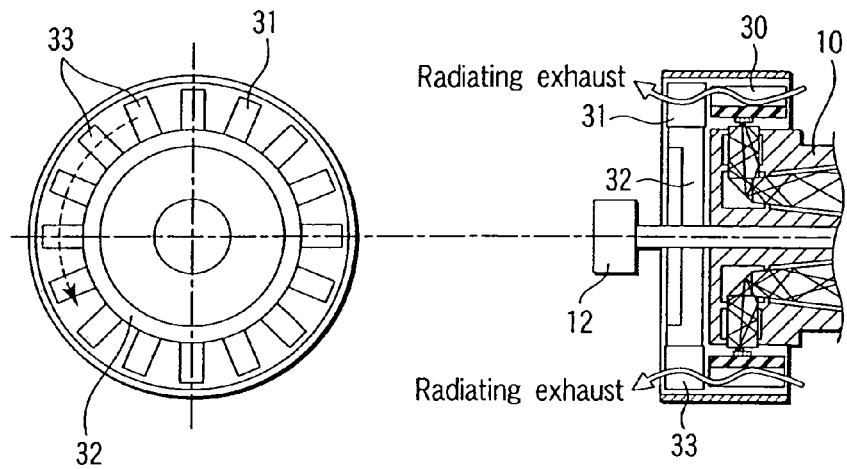
FIG. 4 is a diagram showing a structure of a modified example of the illumination apparatus according to the first embodiment.

In the structure shown in FIG. 1, the radiating plate 30 is provided at a radiating section radiating heat which the plurality of LEDs 14 generate. As shown in FIG. 4, a radiating fan 31 serving as a radiating exhaust member for exhausting air contacting with the radiating section may be further provided. Here, the radiating fan 31 is structured due to a plurality of fins 33 being attached at a predetermined interval, so as to have an angle in which a direction of the radiating exhaust is directed toward the rotating motor 12 side, on the peripheral surface of a fin attaching member 32 connected to the shaft of the rotating motor 12 for rotating the light guiding rod member 11, i.e., the rod holder 10. Accordingly, at the same time when the light guiding rod member 11 is rotated by the rotating motor 12, the radiating fan 31 rotates, and it is possible to exhaust the air contacting with the radiating section. In this way, in accordance with the present modified example, because the rotating motor 12 for making the light guiding rod member 11 be rotatable and a motor of the radiating fan 31 for carrying out radiating of the LED 14 are the same, two functions can be realized by a single driving force source. Namely, because the driving force source is effectively used, it is possible to reduce a working space, and to effectively use electric power.

Figure 5:
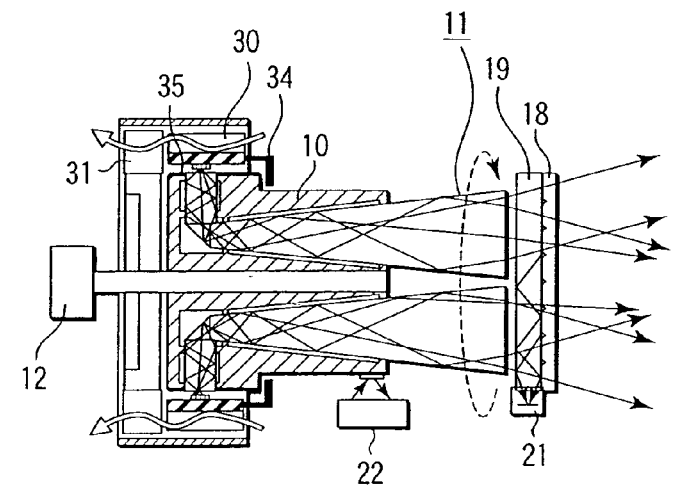
FIG. 5 is a diagram showing a structure of another modified example of the illumination apparatus according to the first embodiment.

Further, another modified example of the illumination apparatus according to the first embodiment shown in FIG. 5 is an example in which a shielding cover 34, for preventing diffused light by the LED 14 which is not incident to the light guiding rod member 11 from leaking out of the illumination apparatus is provided. In accordance with such a structure, among the light generated by the LED 14, unnecessary light which does not contribute for illumination and makes a desired characteristic as illumination light deteriorate can be effectively reduced or eliminated. Namely, an illumination apparatus which can obtain merely effective illumination light can be realized.

Further, in this case, moreover, as shown in the same drawing, a light absorption layer 35 is more preferably applied to the surfaces of the rod holder 10 on which the diffused light which is not incident to the light guiding rod member 11 is illuminated. By applying the light absorption layer 35, among the light generated by the LED 14, diffused light which does not contribute for illumination and which is unnecessary can be effectively reduced or eliminated. Namely, an illumination apparatus which can obtain merely effective illumination light can be realized.

Various applications can be considered for the illumination apparatus according to the first embodiment of the present invention as described with reference to the above FIG. 1 thorough FIG. 5, and one of the applications is for an image projection apparatus.

As shown in FIG. 6, the image projection apparatus has a superposition lens 36, a display device 37, and a projection lens 38, in addition to the illumination apparatus having the structure shown in FIG. 1, FIG. 4 or FIG. 5. Namely, the light from the outgoing end surface of the light guiding rod member 11 of the illumination apparatus is condensed on the transmission type display device 37 disposed at the objective irradiation region by the superposition lens 36, and an image formed at the display device 37 is projected on a screen 39 by the projection lens 38.

In this case, the light guiding rod member 11 is disposed such that the outgoing end surface of the light guiding rod member 11 is positioned at the front side focal point position of the superposition lens 36. In accordance therewith, an optical pupil is formed in the vicinity of the focal point position of the superposition lens 36. Therefore, provided that the display device 37 is disposed at the pupil position, the image side telecentric system Koehler illumination with the outgoing end surface of the light guiding rod member 11 serving as a virtual light source is achieved. Namely, due to the light guiding rod member 11 condensing the emitted light from a micro-surface light source such as the LED 14 and the superposition lens 36 forming a predetermined sized pupil from the outgoing light from the light guiding rod member 11 being provided, an illumination system having a short optical length can be achieved with a relatively simple structure. Further, the radiation angle characteristic of the LED 14 draws a relatively gentle curve, because the radiation angle characteristic is converted into unevenness in intensity on the pupil with respect to the pupil due to the pupil being formed by the superposition lens 36, provided that the pupil is the objective irradiation region, the illumination apparatus in which unevenness in illumination is little and which can carry out uniform illumination can be achieved.

Further, as described above, unevenness in angles can be reduced due to the LSD 18 being disposed at the following stage of the light guiding rod member 11. However, when the Koehler illumination is carried out, provided that the characteristic of the LSD 18 is contrived, an attempt can be made to improve efficiency. Namely, as shown as a front view as seen in the direction of the arrows AA' line in FIG. 7, the emitted light from the tapered rod 17 of the light guiding rod member 11 is momentarily a rectangular shaped luminous flux as shown by the broken line. However, due to the high-speed rotation, the emitted light from the tapered rod 17 of the light guiding rod member 11 is visually a circular luminous flux in which the apex angle of the rectangle inscribed thereat as shown as a rotational locus shape. In contrast, because the display device 37 generally has a rectangular light-receiving surface, when an attempt is made to illuminate the entire rectangular light-receiving surface, the light at the portion which is out of the rectangular region is wasted. Then, as shown as a front view as seen in the direction of the arrows BB' line in FIG. 7, even if the LSD 18 having a luminous flux shape transforming function in which a circular luminous flux is transformed into a rectangular luminous flux is used, a luminous flux having a substantially same shape as the light-receiving surface of the display device 37 can be obtained in the same way as shown as a front view as seen in the direction of the arrows CC' line, and efficiency of area utilization is further improved.

Note that the details of the LSD 18 are disclosed in, for example, U.S. Pat. No. 5,365,354 and U.S. Pat. No. 5,534,386, and it is possible to control light distribution due to a surface relief technique in which a hologram pattern is processed onto a surface of a material such as resin or the like. For example, a beam reshaping diffuser which has been merchandised as a trade name of an LSD53 has been known.

In this way, by disposing the LSD 18 at the outgoing end surface of the light guiding rod member 11, due to a pupil shape being made similar to, not a round shape, but a desired shape, an attempt can be made to improve the efficiency.

Second Embodiment

As described above, various applications can be considered for the illumination apparatus described in the first embodiment, and it can be considered that the structure is appropriately changed in accordance with an application to which the illumination apparatus is applied.

Figure 8:
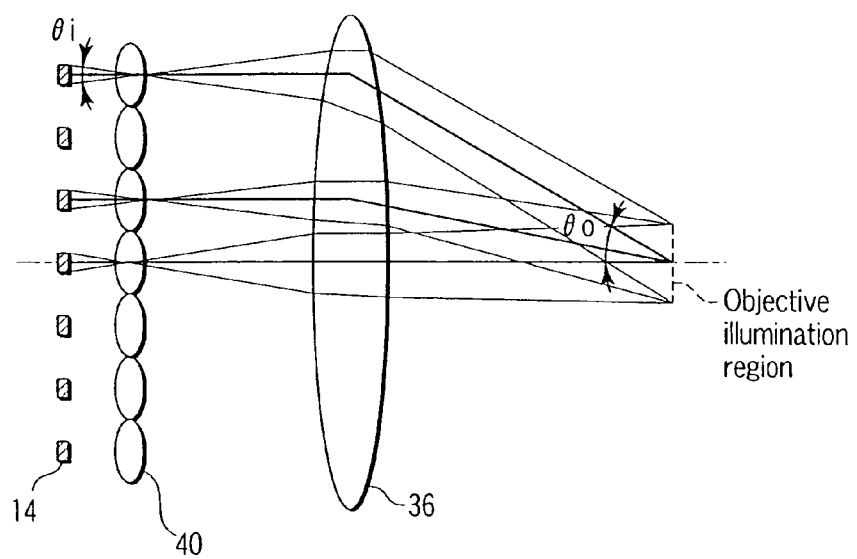
FIG. 8 is a diagram showing a structure of an optical system in a conventional illumination apparatus (conventional model)

Before the detail of the structural change is described, a conventional illumination apparatus will be described in order to compare therewith. As shown in FIG. 8, the conventional illumination apparatus (hereinafter, referred to as a conventional model) is structured such that a large number of LEDs 14 are fixedly arranged therein, and take-in lenses 40 corresponding to the individual LEDs 14 and the superposing lens 36 superposing light emitted therefrom are provided, and an objective illumination region is illuminated by condensing the light from the large number of LEDs 14 which were simultaneously lit by the take-in lenses 40 and the superposing lens 36. Accordingly, with respect to the light generated by the LED 14 which is farthest away from the optical path center of the superposing lens 36, an outgoing angle $\theta o$ of the superposing lens 36 must be by necessity extremely larger than an incident angle $\theta i$ to the take-in lens 40, and the light which is within an incident angle within a predetermined range at the objective illumination region is small, and the efficiency for light utilization and the luminous flux angle (NA) conversion efficiency are poor. Therefore, the quantity of taken-in light is extremely small for the number of lightings. However, because the LED itself does not move, but is fixedly disposed, a good state of variations in quantity of light can be obtained.

Figure 9:
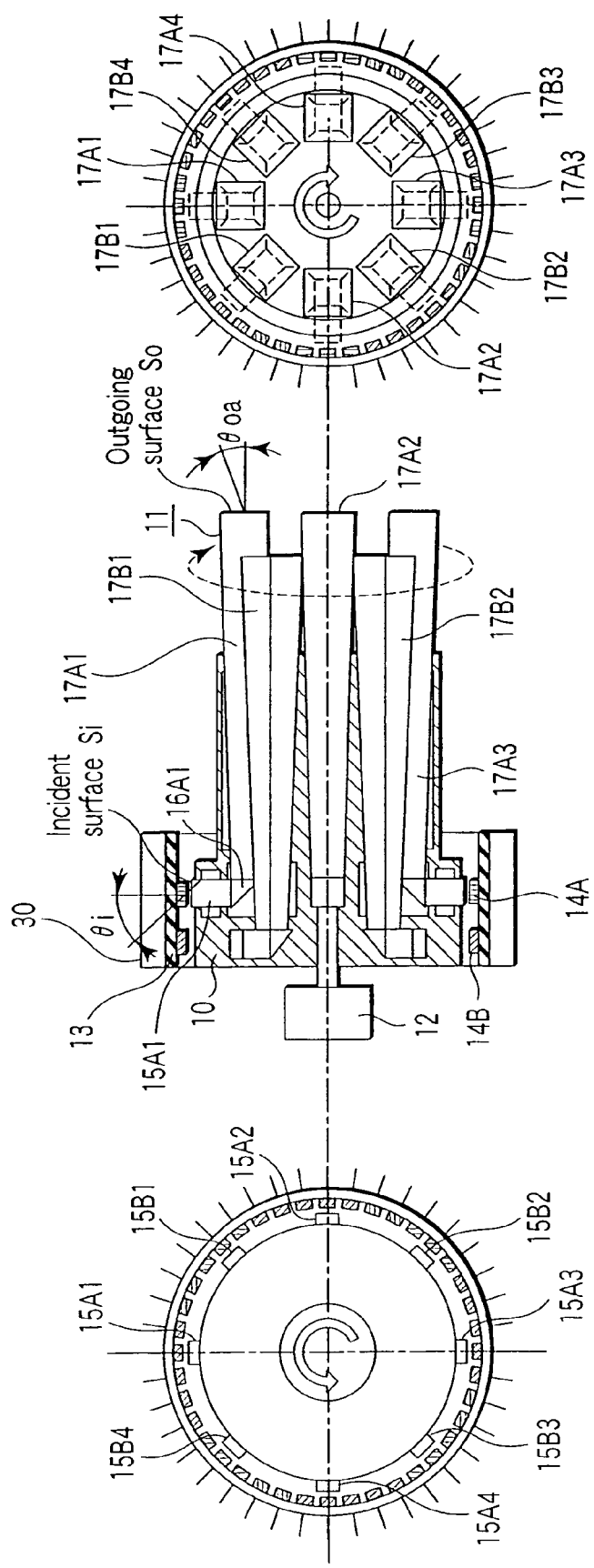
FIG. 9 is a diagram showing a structure of an illumination apparatus (model A), which is a light quantity prior type, according to a second embodiment of the present invention.

In contrast, FIG. 9 is a diagram showing a structure of an illumination apparatus (hereinafter, referred to as a model A) when the quantity of light is given priority in order to apply the illumination apparatus to an application for which a large quantity of light is required. Namely, in this case, a predetermined number of the LEDs 14 having luminescent colors of red (R), green (G), and blue (B) are each made in unit of one set, and four of the sets are made in one line, and two lines (A line, B line) are set in array at the inner circumference of the drum shaped illuminant substrate 13. Here, an LED 14A of A line and an LED 14B of B line are in the same arranging order of the luminescent colors. However, the LED 14A and the LED 14B are arranged so as to be offset by ⅛ of a circle. Further, four of the light guiding rod members 11 of A series for guiding the light from the LED 14A of A line and four of the light guiding rod members 11 of B series for guiding the light from the LED 14B of B line, i.e., a total of eight light guiding rod members 11, are attached to the rod holder 10 such that the eight of the members of A series and B series are alternated. In this case, because the respective light guiding rod members 11 have the same specifications, incident surfaces Si of parallel rods 15A1 through 15A4 of the A series light guiding rod members 11 and incident surfaces Si of parallel rods 15B1 through 15B4 of the B series light guiding rod members 11, and outgoing surfaces So of tapered rods 17A1 through 17A4 of the A series light guiding rod members 11 and outgoing surfaces So of parallel rods 17B1 through 17B4 of the B series light guiding rod members 11, are attached so as to be shifted by the interval between the LED 14A and the LED 14B. Further, the incident surfaces Si of the parallel rods 15A1 through 15A4, and 15B1 through 15B4 are the substantially same size as a size of the LED light-emitting surface.

Note that it can be understood that the central diagram in FIG. 9 is typically shown in order to understand the arranging relationship of the respective light guiding rod members 11, and is not an accurate sectional view. Further, although not illustrated by denoting reference numerals in the drawing, it goes without saying that the parallel rods 15A1 through 15A4 and the tapered rods 17A1 through 17A4 are respectively connected to one another via reflecting prisms 16A1 through 16A4, and the parallel rods 15B1 through 15B4 and the tapered rods 17B1 through 17B4 are respectively connected to one another via reflecting prisms 16B1 through 16B4.

In such a structure, in accordance with rotations of eight of the light guiding rod members 11, due to four of the respective LEDs 14A, 14B of A line and B line, i.e., a total of eight LEDs being simultaneously lit in order for the parallel rods 15A1 through 5A4 and 15B1 through 15B4 to fetch light having the same luminescent color, a large quantity of light can be obtained. Namely, in model A, a large number of the LEDs 14 are simultaneously lit, and quantity of taken-in light is made large. However, because the number of the light guiding rod members 11 is large, the area ratio of each incident surface Si and each outgoing surface So cannot be made large. Therefore, an outgoing angle θoa cannot be made small with respect to the incident angle θi, and the NA conversion efficiency is poor. Further, because the incident surface Si is made to be the substantially same as the LED light-emitting surface, a large quantity of taken-in light for each parallel rod cannot be obtained, and because the number of simultaneous lighting is large, the quantity of light cannot be obtained for the total electric power supplied to the LEDs 14, and the efficiency for light utilization is poor. With respect to variations in the quantity of light, because the incident surface Si and the LED light-emitting surface are substantially the same, the variations in the quantity of taken-in light is large in accordance with the rotation of the light guiding rod member 11.

Further, FIG. 10 is a diagram showing a structure of an illumination apparatus (hereinafter, referred to as a model B) when the efficiency for light utilization is given priority. Namely, in this model B, the LEDs 14 are structured such that a predetermined number of the LEDs 14 having luminescent colors of red (R), green (G), and blue (B) are each made to be one set, and four of the sets are set in array at the inner circumference of the drum shaped illuminant substrate 13. Further, four of the light guiding rod members 11 are attached to the rod holder 10. In this case, the incident surfaces Si of the parallel rods 15 of the respective light guiding rod members 11 have the substantially same size as that of the LED light-emitting surface. In such a structure, in accordance with rotations of four of the light guiding rod members 11, the four LEDs 14 are almost lit in order for the parallel rods 15 of the respective light guiding rod members 11 to fetch the light of the same luminescent color. In model B, because a number of simultaneous lighting of the LEDs is set to a number which is a half number of that of model A, and the incident surface Si is made to be simultaneously the same as the LED light-emitting surface, the quantity of taken-in light of the individual light guiding rod members 11 cannot be as great as that in above-described model A. However, an area ratio of the incident surface Si and the outgoing surface So can be set so as to be larger than that of model A, and an outgoing angle θob with respect to the incident angle θi can be made larger than that of model A. Therefore, the efficiency for light utilization and the NA conversion efficiency thereof are better than those of model A. Further, although each light guiding rod member 11 is the same as that of model A, because the number of simultaneous lighting of the LEDs is less than that of model A, the variation in light quantity is superior to that of model A.

In contrast, FIG. 11 is a diagram showing a structure of an illumination apparatus (hereinafter, referred to as a model C) when the NA conversion efficiency is given priority. Namely, in this model C, with an arrangement of the LEDs 14 which is the same as that of model B, two of the light guiding rod members 11 are provided, and two of the LEDs 14 are simultaneously lit in order for the parallel rods 15 of the respective light guiding rod members 11 to fetch light of the same luminescent color in accordance with the rotation of the light guiding rod members 11. In model C, because an area ratio of the incident surface Si and the outgoing surface So can be made larger than those of model A and model B, and the outgoing angle θoc can be made small with respect to the incident angle θi, the NA conversion efficiency is superior. However, because the number of simultaneous lightings thereof is the least among the three models, the quantity of taken-in light, the efficiency for light utilization, and the suppression effect for variation in quantity of light cannot be markedly expected.

Further, FIG. 12 is a diagram showing a structure of an illumination apparatus (hereinafter, referred to as a model D) when the light quantity variation control and the NA conversion efficiency are given priority. Namely, in this model D, in the structure which is the same as that of model C, the incident surface Si of the light guiding rod member 11 is structured so as to be a rectangular shape having the long sides in the direction of the arrangement of the LEDs 14 set in array on the illuminant substrate 13 and so as to be a size which can fetch two of the LEDs, and two LEDs 14 each (i.e., a total of four LEDs 14) are simultaneously lit in order for the parallel rods 15 of the respective light guiding rod members 11 to fetch light of the same luminescent color in accordance with the rotations of the light guiding rod members 11. Note that, in this case, the outgoing surface So of the light guiding rod member 11 is a rectangular shape in which the lengths of the respective sides of the corresponding incident surface Si are made long, i.e., a rectangular shape in which the sides facing the center of the circle of the illuminant substrate 13 are the longer sides. In model D, because the number of the simultaneous lighting of the LEDs 14 is the same number as that of model B, a relatively large quantity of light can be obtained, and because the incident surface Si is structured so as to be able to fetch two of the LEDs due to two of the adjacent LEDs being simultaneously lit, the efficiency for light utilization is the highest, and because an area ratio of the incident surface Si and the outgoing surface So can be made large, and the outgoing angle θoc can be made small with respect to the incident angle θi, the NA conversion efficiency thereof is superior. The suppression for the variations in quantity of light is the second superiority after the conventional model in which the LED 14 is not made rotatable.

FIG. 13 shows a table in which evaluations of the characteristics of the conventional model, model A, model B, model C, and model D which were shown in FIG. 8 through FIG. 12 are compared with each other. In this case, items for evaluation are an absolute quantity of taken-in light, the efficiency for utilization of light emitted with respect to electric power supplied to the LEDs 14, the NA conversion efficiency of the light guiding rod member 11, and the suppression effect for variation in quantity of light of the taken-in light, and the respective models are relatively compared in order from the better characteristic in the items for evaluation. Namely, the absolute quantity of taken-in light is the best in model A, and worsens in the order of model D, model B, model C, and the conventional model. The efficiency for utilization of light emitted with respect to electric power supplied to the LEDs 14 is the best in model D, and worsens in the order of model C, model B, model A, and the conventional model. The NA conversion efficiency of the light guiding rod member 11 is the best in model C, and worsens in the order of model D, model B, model C, and the conventional model. Further, the suppression effect for variation in quantity of light of the taken-in light is the best in the conventional model, and worsens in the order of model D, model C, model B, and model A. Accordingly, in consideration of all of the items for evaluation, it can be said that model D has the structure which is the best in terms of balance.

Note that, in the above-described models A, B, and C, the light-emitting surface of the LED 14 contributing for taken-in light into the parallel rod 15 varies moment by moment. However, a contribution area in a given moment of the light-emitting surface corresponds to "an area of an light-emitting surface emitting the diffused light according to the light introduced to the illumination region".

Third Embodiment

In the illumination apparatus having the structure as described in the above-described first and second embodiments, because the LEDs 14 are discretely arranged, and discretely repeat flashing and lighting-out, variations in quantity of light arise. This will be described with reference to FIG. 14. Note that FIG. 14 is a diagram in a case in which, given that an arranging pitch of the LEDs 14 is p, and a width of the parallel rod 15 of the light guiding rod member 11 is dy, the relationship of p<dy<2p is established.

Figure 14:
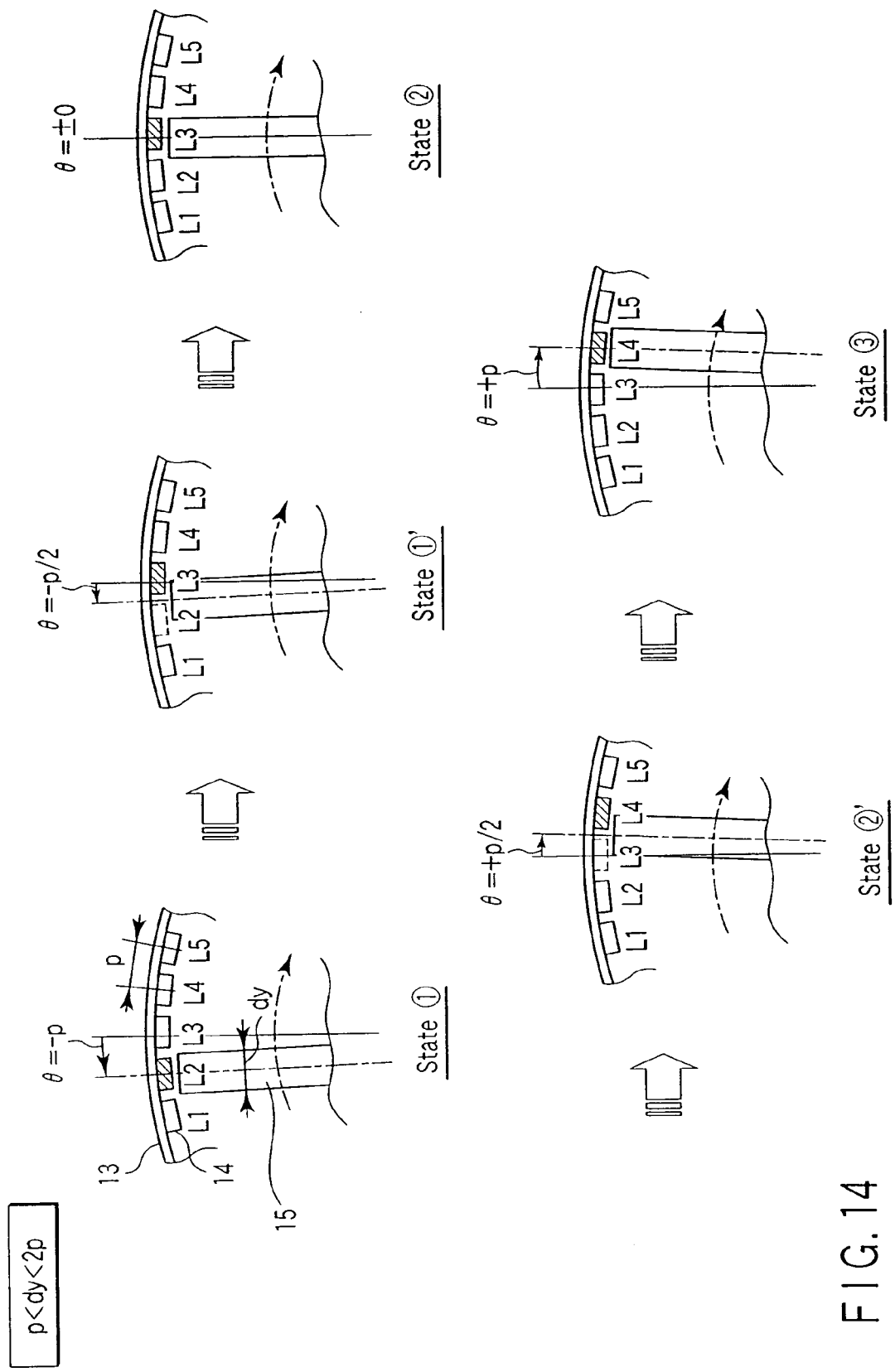
FIG. 14 is a diagram showing transitions of the rotational positions of a parallel rod and LEDs made to emit light in the illumination apparatus, which carries out smoothing variations in quantity of light by merely the control for quantity of light of the LEDs, according to the first or second embodiment.

Namely, as shown in FIG. 14, when the light guiding rod member 11 rotates from state ① to state ③, in state ①, the parallel rod 15 exactly faces a L2nd LED 14, and the L2nd LED 14 is being lit. Further, the rotation further proceeds, and when the light guiding rod member 11 rotates a half of a pitch (p/2) and is in state ①', lighting is switched from the L2nd LED 14 to the L3rd LED 14. The L3rd LED 14 is being lit until immediately before state +①' becomes state ②' through the state ②. Further, in the same way as the state ①', the L4th LED 14 is continuously being lit after being in state ①' after the L3rd LED 14 is switched to the L4th LED 14 in state ①'. When the parallel rod 15 and the LED 14 exactly face one another as in the states ①, ②, and ③, the light from the LED 14 can be taken in at the maximum, and when an emitting LED 14 is switched as in states ②' and ③', the quantity of taken-in light is approximately half of the maximum. Namely, the quantity of taken-in light at the time of states ①, ②, and ③ is expressed by "1", it can be understood that the quantity of taken-in light largely varies as shown by the alternate long and short dash line in FIG. 15.

Figures 16, 17:
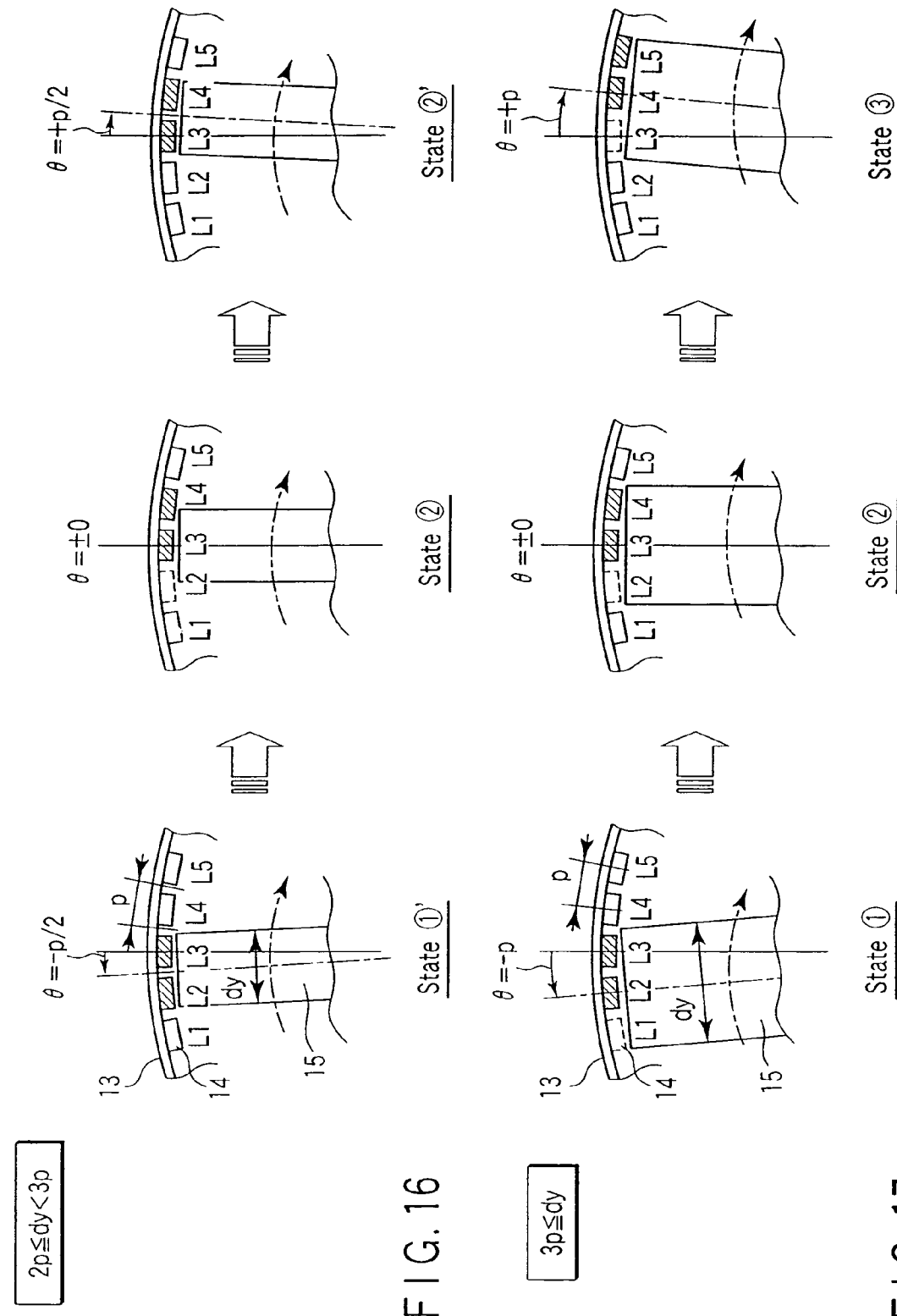
FIG. 16 is a diagram showing transitions of the rotational positions of a parallel rod and LEDs made to emit light in an illumination apparatus, in which a take-in opening size of a parallel rod is greater than or equal to two of LEDs and less than three of LEDs, and two of the adjacent LEDs are simultaneously lit, according to a third embodiment.
FIG. 17 is a diagram showing transitions of the rotational positions of the parallel rod and the LEDs made to emit light in the illumination apparatus, in which a take-in opening size of the parallel rod is greater than or equal to three of the LEDs and two of the adjacent LEDs are simultaneously lit, according to a third embodiment.

In order to smooth such variations in quantity of light, in the illumination apparatus according to the present embodiment, as shown in FIG. 16, the width dy of the parallel rod 15 of the light guiding rod member 11 is structured so as to establish the relationship which is 2p≦dy<3p, i.e., such that the size of the incident surface Si is made to be a size which can fetch two of the LEDs, and two of the adjacent LEDs 14 are lit. Namely, in state ①' in which the parallel rod 15 is positioned at a position shifted by a half of a pitch from the LED 14, the parallel rod 15 faces two of the L2nd LED 14 and the L3rd LED 14, and these L2nd and L3rd LEDs 14 are being lit. Further, when the parallel rod 15 rotates a half of a pitch (p/2) and is in a state ② due to the rotation further proceeding, the lighting of the LEDs 14 is controlled such that the lighting is switched from the L2nd LED 14 to the L4th LED 14. In accordance with such a structure and such a control, variations in quantity of light can be suppressed as shown by the broken line in FIG. 15.

Further, as shown in FIG. 17, the width dy of the parallel rod 15 of the light guiding rod member 11 may be structured so as to establish the relationship which is 3p≦dy, i.e., the size of the incident surface Si may be structured so as to be a size which can fetch three of the LEDs, and two of the adjacent LEDs 14 may be lit. Namely, in state ① in which the parallel rod 15 is positioned at a position shifted by a half of a pitch from the LED 14, the parallel rod 15 faces three of the L1st, L2nd, and L3rd LEDs 14, and the lighting is switched from the L1st LED 14 to the L3rd LED 14, and the L2nd LED 14 and the L3rd LED 14 are being lit. Further, the rotation further proceeds, and when the parallel rod 15 rotates one pitch and is in state ②, the parallel rod 15 faces three of the L2nd, L3rd LED 14, and L4th LEDs 14, and the lighting is switched from the L2nd LED 14 to the L4th LED 14, and the lighting of the LEDs 14 is controlled such that the L3rd and L4th LEDs 14 are lit. In accordance with the structure and the control, because a state can be made in which two of the emitting LEDs 14 are made to always face the incident surface Si of the parallel rod 15, and light is made to incident, as shown by the solid line in FIG. 15, variations in quantity of light can be further suppressed.

Figure 18:
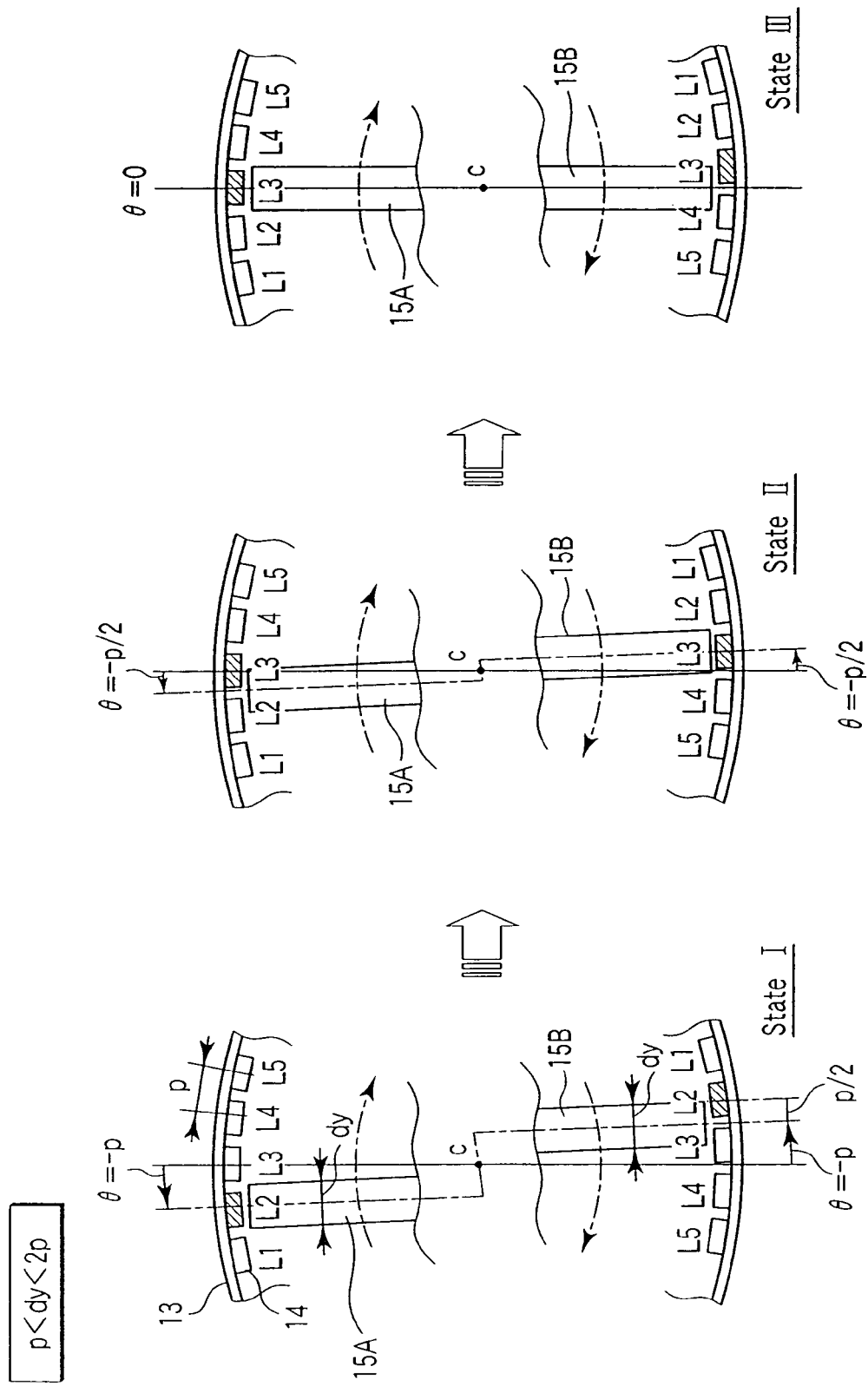
FIG. 18 is a diagram showing transitions of the rotational positions of the parallel rod and the LEDs made to emit light in another structural example of the illumination apparatus, in which a three-dimensional phase of the LED and the take-in opening of the parallel rod is shifted by a half of a pitch, according to the third embodiment.

FIG. 18 is a diagram showing another structural example for suppressing variations in quantity of light. In an illumination apparatus in this case, an odd number of LEDs 14 are arranged on the illuminant substrate 13, and two of the light guiding rod members 11 are made to be one set, and at least one set is provided, and the parallel rods of the light guiding rod members 11 of each set, for example, the parallel rods 15A and 15B are attached to the rod holder 10 such that the LED diffused light emitted on a position on the circumference which is point-symmetrical with respect to a rotation center C is guided to the objective illumination region. In such a structure, the arrangement of the LEDs 14 is not point-symmetrical, and the opposite LED is shifted by a half of a pitch. Accordingly, when the one parallel rod 15A is positioned at a position opposite to one LED 14, the other parallel rod 15B disposed so as to be point-symmetrical with respect to the one parallel rod 15A is shifted by a half of a pitch, and is in a state of being over two of the LEDs 14. Therefore, the parallel rod 15A in state I shown in FIG. 18 is in the same way as in state ① shown in FIG. 14, and the parallel rod 15A in state II is in the same way as in state ①', and the parallel rod 15A in state III is in the same way as in state ②, and the variations in quantity of light as shown by the broken line in FIG. 19 arise. In contrast, in the other parallel rod 15B, because the quantity of taken-in light is the quantity in a case in which the other parallel rod 15B is shifted by a half of a pitch from the parallel rod 15A, as shown by the alternate long and short dash line in FIG. 19, the phase of the quantity of taken-in light of the parallel rod 15B is shifted by a half of a pitch. However, the same variations in quantity of light arise. In this way, variations in quantity of light arise in the respective light guiding rod members 11. However, illumination with respect to the objective illumination region is carried out due to the outgoing light from all of the light guiding rode members 11 being synthesized. Accordingly, the quantity of light in which the individual quantities of taken-in light are synthesized, is a total quantity of taken-in light as shown by the solid line in FIG. 19, and the variations in quantity of light is smoothed.

Namely, two of the light guiding rod members 11 for guiding illumination light are prepared so as to be point-symmetrical with respect to one another, and because an odd number of the LEDs 14 can be disposed such that an arranging pitch of the LEDs 14 is an approximately constant interval, the positional relationship between the LED 14 and the incident surface of the light guiding rod member 11 can be made so as to be a state of being shifted by a half of a pitch each other. In accordance therewith, because a total quantity of the light taken-in by the two light guiding rod members 11 is made to be in a substantially constant state, as a result, illumination light is provided such that variations in the illumination light is suppressed, and good illumination light can be obtained.

Figure 20:
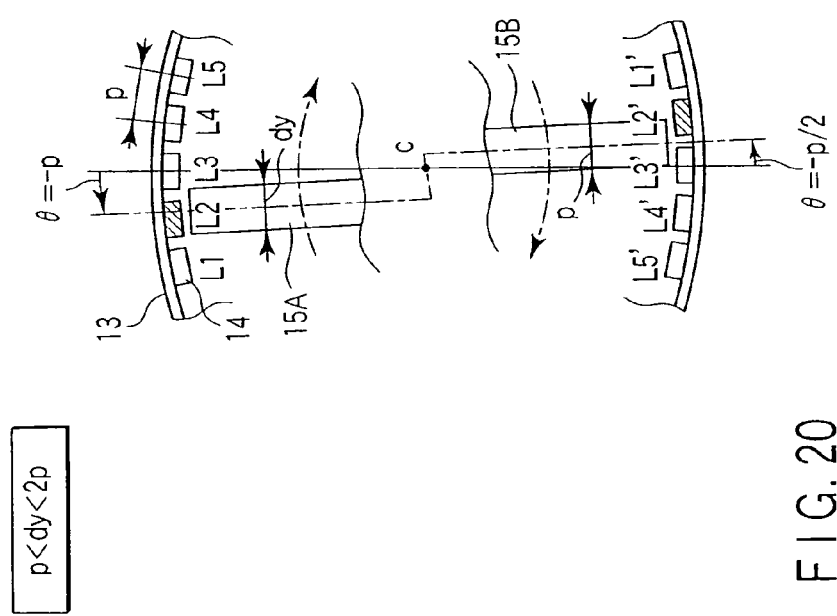
FIG. 20 is a diagram showing even another structural example of the illumination apparatus, in which a three-dimensional phase of the LED and the take-in opening of the parallel rod is shifted by a half of a pitch, according to the third embodiment.

Further, as shown in FIG. 20, it may be structured such that the number of the LEDs 14 arranged on the illuminant substrate 13 is made to be an even number, and the parallel rods 15A and 15B of the light guiding rod members 11 of each set guide the diffused light emitted from the LED 14 which is positioned at the position point-symmetrical with respect to the rotation center, to the objective illumination region. Namely, two of the parallel rods are prepared according to the fact that the optical member guiding the illumination light is shifted half of a pitch of the LED 14 from the state of being point symmetrcal with respect to each other, and because an arranging pitch of the LEDs 14 is a substantially constant interval, and an even number of the LEDs 14 can be arranged, the light guiding rod member 11 can be made so as to be in a state in which the positional relationship between the LED and the incident surface of the light guiding rod member 11 is shifted by a half of a pitch. Therefore, because a total quantity of the light taken-in by the two light guiding rod members 11 can be made so as to be in a substantially constant state, as a result, illumination light is provided such that the variations therein is suppressed, and good illumination light can be obtained.

However, in the structure shown in FIG. 20, the light guiding rod members 11 which are the rotatable members are not arranged so as to be point-symmetrical. Namely, because the rotational balance is lost, it is necessary to keep a weight balance in consideration of the off-balance.

Fourth Embodiment

Figure 21:
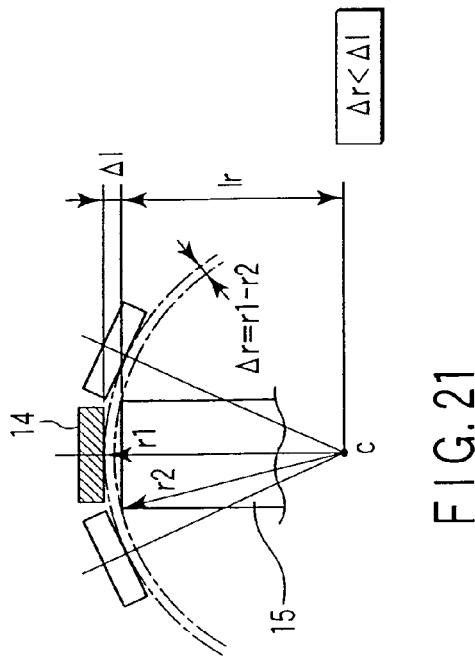
FIG. 21 is a diagram for explanation of an arranging relationship of a rod rotational diameter and the LEDs in the illumination apparatus according to the first through third embodiments.

In the illumination apparatus described in the first through third embodiments, when the light guiding rod member 11 is rotated, in order for the corner of the parallel rod 15 to be not touched with the LED 14, as shown in FIG. 21, it is necessary for the light guiding rod member 11 to be attached to the rod holder 10 such that the corner of the parallel rod 15 is moved a radius of gyration r2 having a predetermined interval Δr with respect to a radius of layout r1 of the light-emitting surface of the LED 14. However, in the case of such a structure, a gap Δ1 between the end surface of the parallel rod 15 and the LED 14 is made large, loss in the quantity of taken-in light is brought about.

Figure 22:
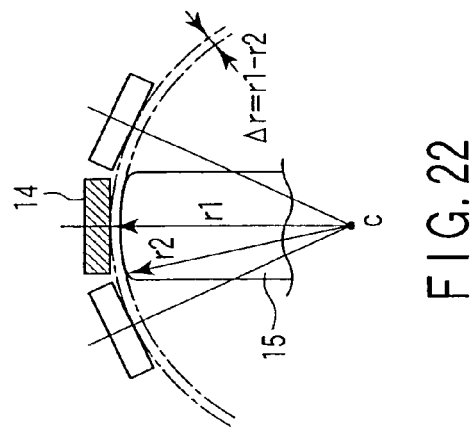
FIG. 22 is a diagram showing a parallel rod end surface shape in an illumination apparatus according to a fourth embodiment of the present invention.

Therefore, in the present embodiment, as shown in FIG. 22, the end surface of the parallel rod 15 is formed in a curve shape so as to be adjusted to the curve of a radius of gyration r2. In accordance with such a structure, because the incident surface of the parallel rod 15, i.e., the light guiding rod member 11 can be close to the light-emitting surface of the LED 14 (can be made to be Δr), the quantity of taken-in light can be increased.

Fifth Embodiment

Figure 23:
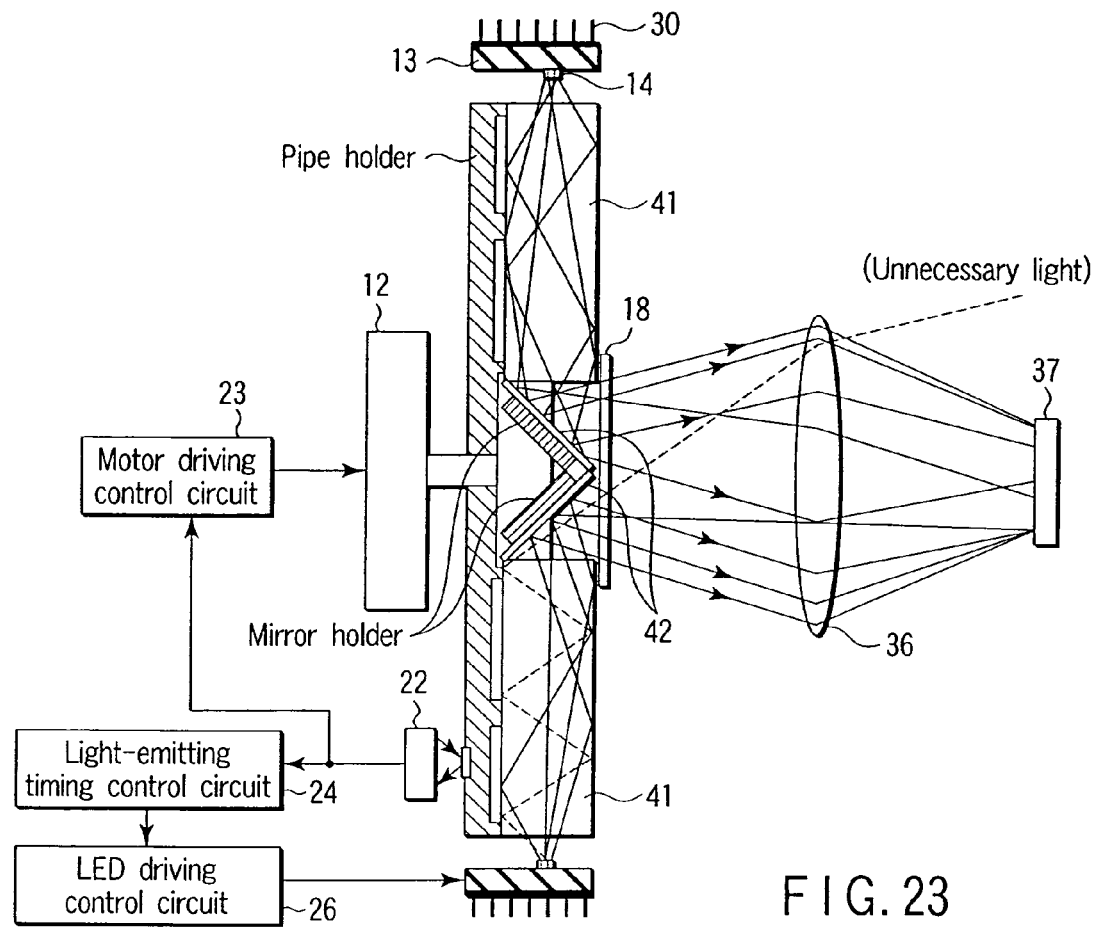
FIG. 23 is a diagram showing a structure of an illumination apparatus according to a fifth embodiment of the present invention.

As shown in FIG. 23, an illumination apparatus according to a fifth embodiment of the present invention uses light pipes 41 and reflecting mirrors 42 as optical members for guiding diffused light from the LED 14 to the objective illumination region, in place of the light guiding rod member 11 as in the first through fourth embodiments. Namely, the light from the LED 14 is reflected and guided by the square-shaped light pipe 41 whose inner surface is processed so as to be a reflecting mirror surface, and a direction of the optical axis of the light is changed by the reflecting mirror 42, and the light from the plurality of light pipes 41 are guided so as to be arranged on the LED 18. In the present embodiment as well, from the standpoint of feeding power, the LED 14 is fixedly provided, the light pipe 41 and the reflecting mirror 42 which are the optical members rotate. Further, because of the Koehler illumination, if a relative position between the light source and the pipe end surface is displaced, there is no case in which the illumination region is displaced.

Because the light pipe 41 does not carry out an NA conversion, but merely guides light, the light whose NA is large and which is shown by the broken line in the drawing arrives a position which is out of the display device 37 disposed at the objective illumination region. Therefore, the present embodiment is effective for a diffused (diffusion) illuminant whose radiating angle is relatively narrow.

Note that, in the present embodiment, it may be structured such that a light guiding plate is disposed between the reflecting mirror 42 and the LSD 18, and some of the emitted light guided by the light guiding plate are monitored by a light quantity monitor, and a driving current of the LED 14 is feedback-controlled by the LED driving control circuit 26.

Sixth Embodiment

Figure 24:
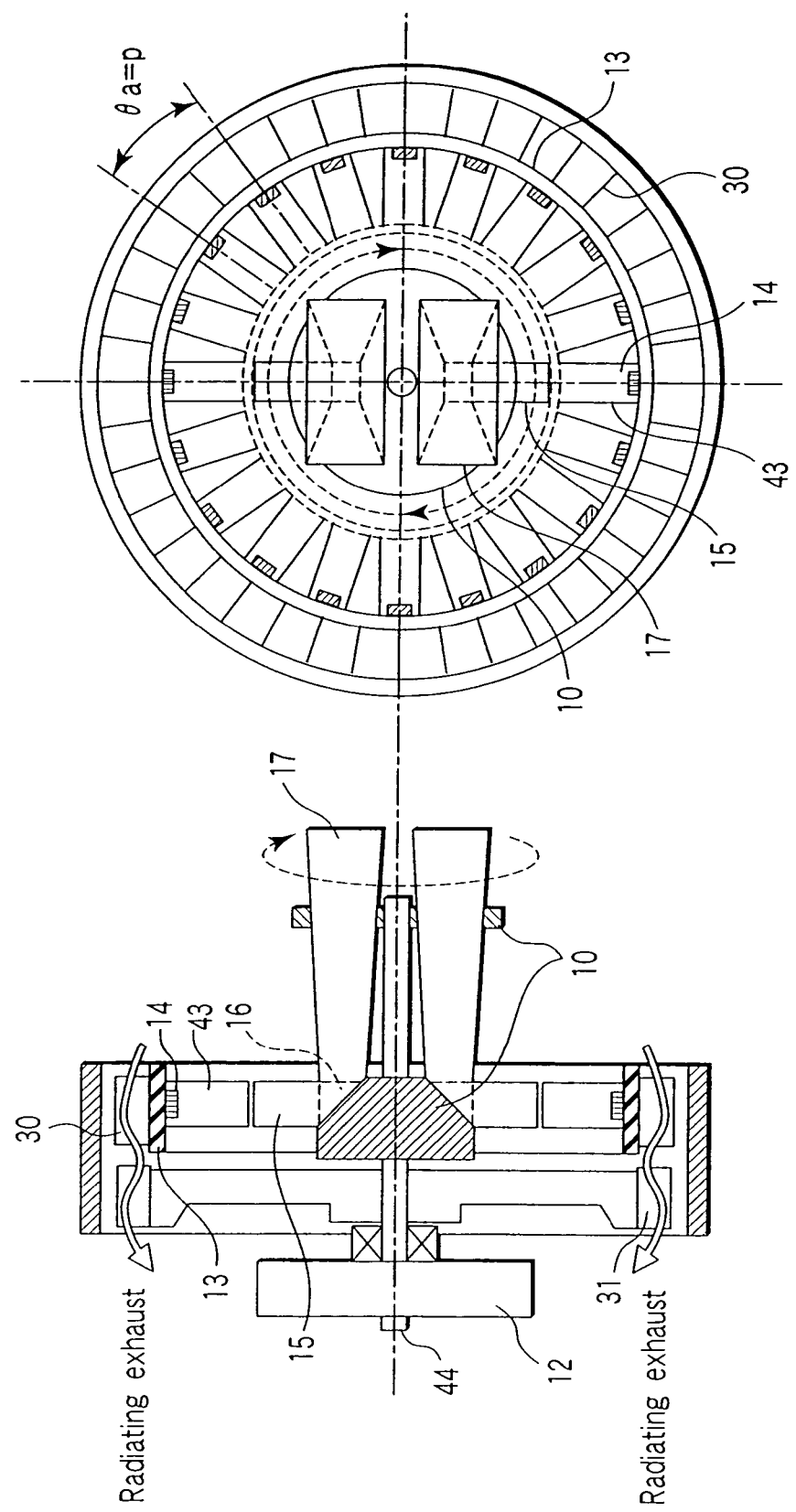
FIG. 24 is a diagram showing a structure of an illumination apparatus according to a sixth embodiment of the present invention.

In the first through fourth embodiments, the parallel rod 15 of the light guiding rod member 11 is held in a state of being close to the light-emitting surface of the LED 14. In a six embodiment, as shown in FIG. 24, the parallel rod 15 is made short, and a parallel rod 43 is fixedly provided with respect to each LED 14 serving as a light guiding member for guiding the diffused light from the LED 14 to the incident surface which is the end surface of the shortened parallel rod 15. In this case, it is in the same way as in the first through fourth embodiments that the light guiding rod member 11 is formed due to the parallel rod 15, the reflecting prism 16, and the tapered rod 17 being integrally connected, and the light guiding rod member 11 is rotated at a high-speed while being held by the rod holder 10 connected to the rotating shaft 44 of the rotating motor 12. Therefore, in the illumination apparatus having such a structure, the LED 14 corresponding to the position of the parallel rod 15 varying in accordance with the rotation emits light, and the diffused light from the LED 14 is guided by the parallel rod 43 provided at the LED 14, and is incident from the outgoing surface of the parallel rod 43 to the incident surface of the parallel rod 15 which is facing at this time, and is reflected at the reflecting prism 16, and is emitted from the outgoing surface of the tapered rod 17.

In accordance with such a structure, because the parallel rod 43 guiding the LED diffused light to the light guiding rod member 11 is provided for each LED 14, even if the arranging pitch of the LEDs 14 cannot be minutely insured, it is possible to make a state in which as if the light guided by the parallel rod 43 is emitted from the minutely arranged LEDs. Namely, the arranging interval of the LEDs 14 can be insured, and designing is made easy, and a minute arrangement of the LEDs 14 is realized, and a state of a shortage in quantity of light taken-in by the light guiding rod member 11 can be eliminated, and a stable illumination light can be obtained.

Figure 25:
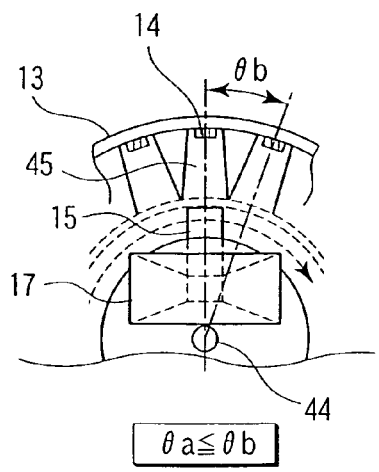
FIG. 25 is a diagram showing a main portion structure in a modified example of the illumination apparatus according to the sixth embodiment.
Figure 26:
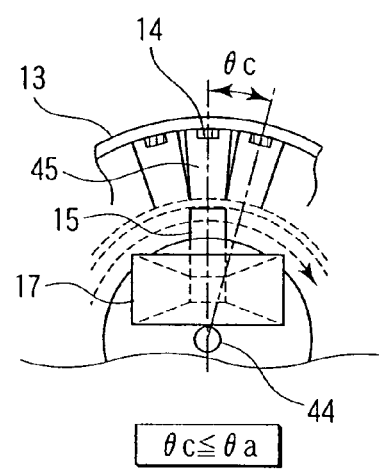
FIG. 26 is a diagram showing a main portion structure in another modified example of the illumination apparatus according to the sixth embodiment.

Note that, as the light guiding member for guiding the diffused light from the LED 14 to the parallel rod 15, as shown in FIG. 25 or FIG. 26, not the parallel rod 43 as described above, but a tapered rod 45 may be used. Here, in FIG. 25, the tapered rod 45 is fixedly installed in a direction such that the taper thereof gradually becomes larger from the end portion at the LED 14 side toward the end portion at the parallel rod 15 side. In this case, because an arranging pitch p of the LEDs 14 is θb which is greater than or equal to θa in the case of using the parallel rod 43, the arranging interval of the LEDs 14 can be further insured, and the designing can be made easier. Further, the tapered rod 45 itself can be made to have the NA conversion effect. In contrast, in FIG. 26, the tapered rod 45 is fixedly installed in a direction such that the taper thereof gradually becomes smaller from the end portion at the LED 14 side toward the end portion at the parallel rod 15 side. In this case, an arranging pitch p of the LEDs 14 is θc which is less than or equal to θa in the case of using the parallel rod 43, the outgoing surfaces of the tapered rods 45 can be minutely arranged.

Figure 27:
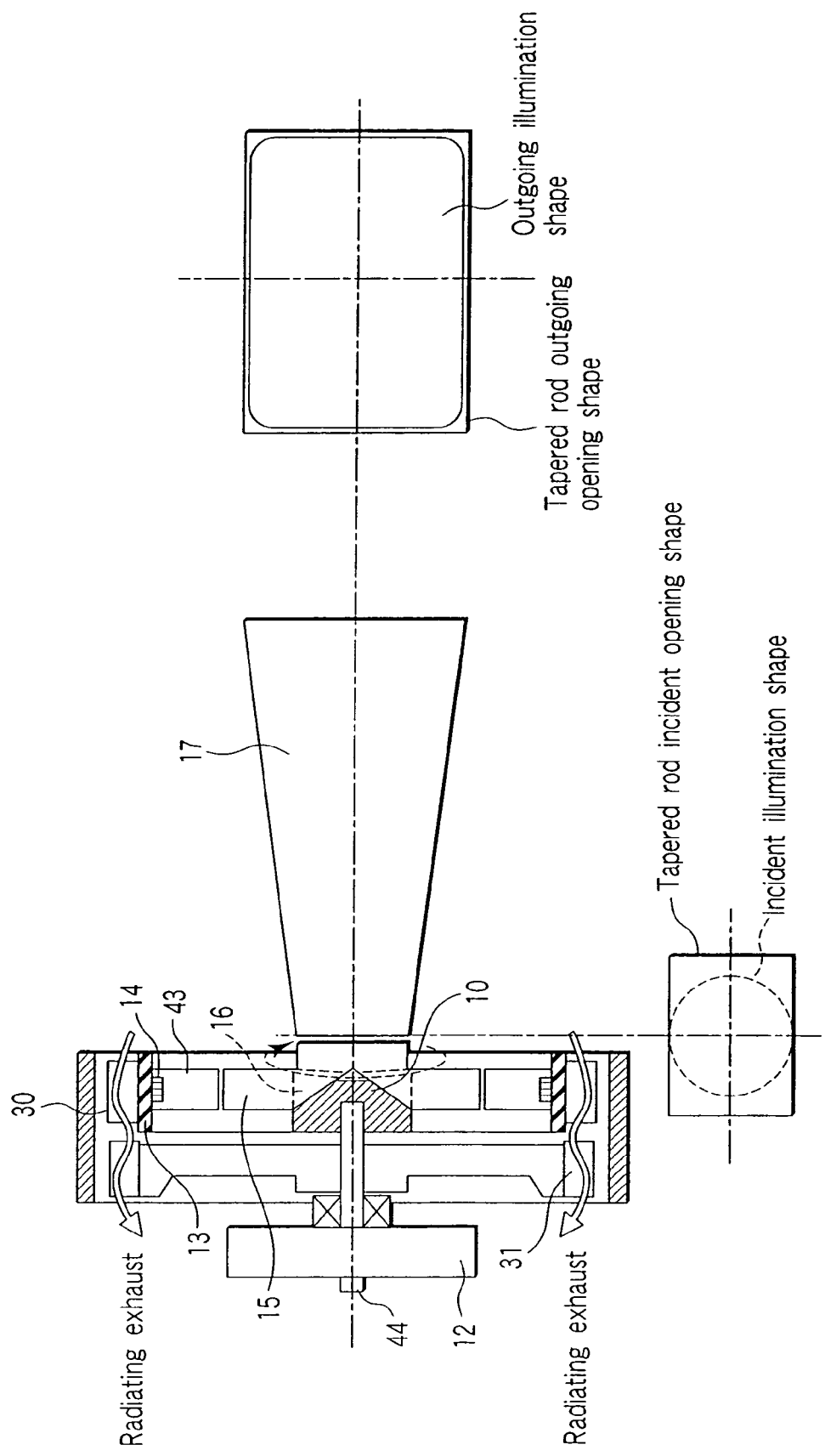
FIG. 27 is a diagram showing a structure in even other modified example of the illumination apparatus according to the sixth embodiment.

Further, in the structure of the illumination apparatus shown in FIG. 24, the reflecting prism 16 and the tapered rod 17 may be separated. Namely, as shown in FIG. 27, the parallel rod 15 and the reflecting prism 16 are integrally connected, and the parallel rod 15 and the reflecting prism 16 rotate at a high-speed as shown by the arrow in the drawing while being held by the rod holder 10 connected to the rotating shaft 44 of the rotating motor 12. Because description that the light from the LED 14 is guided to the reflecting prism 16 is the same as the description in FIG. 24, the description is omitted. The outgoing light from the reflecting prism 16 is incident as a circular incident illuminated shape to the incident opening of the tapered rod 17 which does not rotate and which is fixedly installed by an unillustrated holding mechanism. Here, the incident opening of the tapered rod 17 is made to be a rectangular shape of a size such that the incident illuminated shape is nearly inscribed to the incident opening. The light incident to the tapered rod 17 is emitted as the illumination light having a substantially rectangular shaped outgoing illuminated shape as shown in the drawing from the outgoing opening of the tapered rod 17 having a rectangular outgoing opening shape. In accordance therewith, because the shape of the illumination light can be obtained as the rectangle, thereafter, when the illumination light is incident to the display device 37 having the rectangular light-receiving surface, the shapes thereof are consistent with one another. Therefore, the illumination light can be efficiently used without waste.

Figure 28:
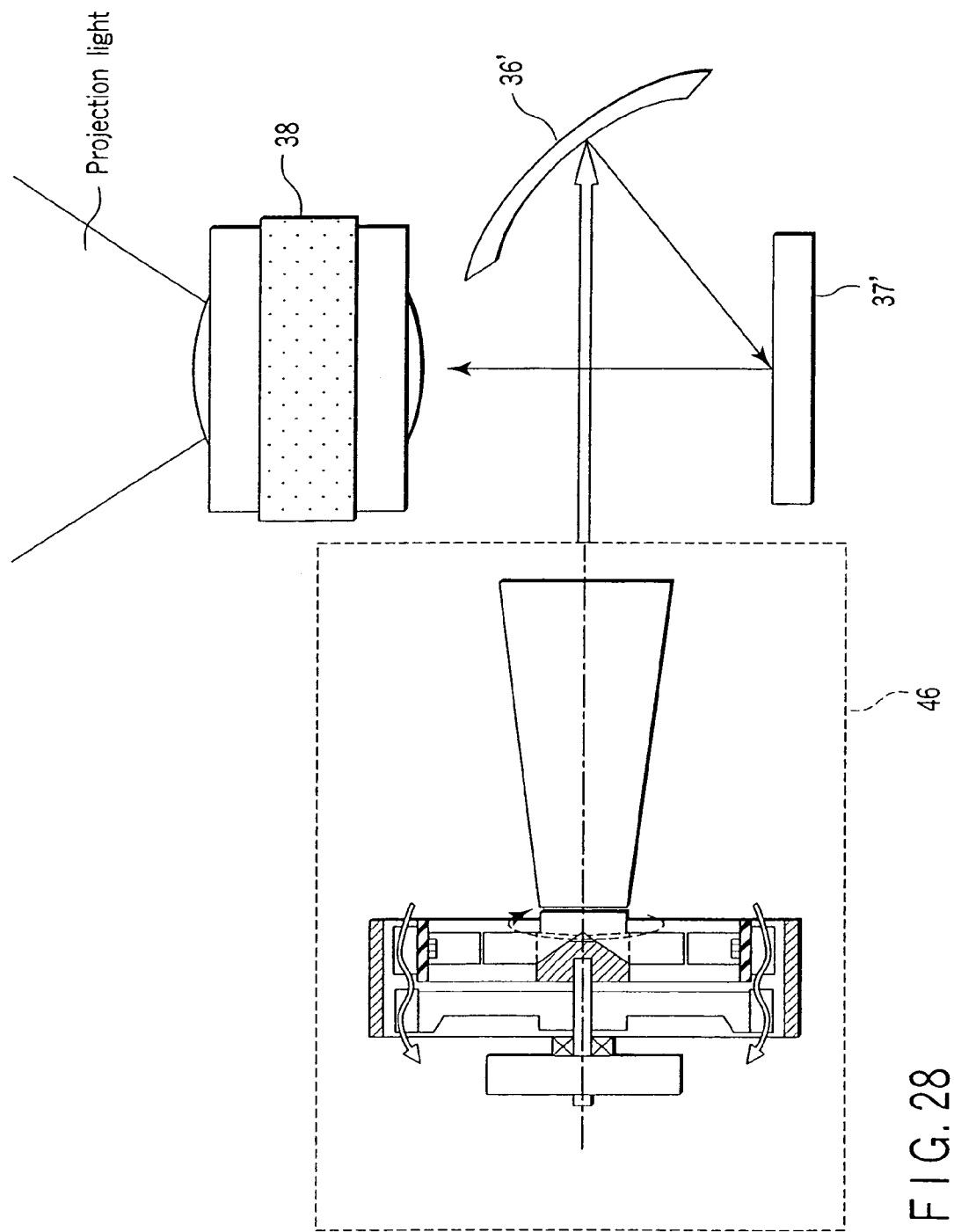
FIG. 28 is a diagram showing a structure of an image projection apparatus using the illumination apparatus according to the sixth embodiment.

FIG. 28 shows a structural example when an illumination apparatus 46 having such a structure is applied to an image projection apparatus. Namely, the light emitted from the illumination apparatus 46 is reflected by a reflecting mirror 36', and is incident to a DMD (trademark) 37' which is a reflection type display device and is modulated. Thereafter, the light is output as a projected light via a projection lens 38. Note that the DMD 37' is a two-dimensional micromirror deflection array, and because the detail thereof is disclosed in Jpn. Pat. Appln. KOKAI Publication No. 11-32278 and U.S. Pat. No. 6,129,437, description thereof will be omitted.

In this case, the outgoing light from the illumination apparatus 46 and the incident light at the light-receiving surface of the DMD 37' structure the critical illumination system by a reflecting mirror 36' having a curvature shape which is designed so as to establish an image-formation relationship. The light-receiving surface of the DMD 37' is a rectangular shape, and a rectangular-shaped outgoing shape from the illumination apparatus 46 is determined in accordance with an aspect ratio of the shape of the light-receiving surface of the DMD 37'. In accordance with the structure, because the illumination optical path is folded up, the apparatus can be made compact. Note that designing of the optical path is achieved such that the so-called off-light at the time of being not incident from the DMD 37' to the projection lens 38 due to the modulating operation of the DMD 37' is not incident to the reflecting mirror 36' and the outgoing opening of the tapered rod 17 of the illumination apparatus 46.

Seventh Embodiment

Figure 29:
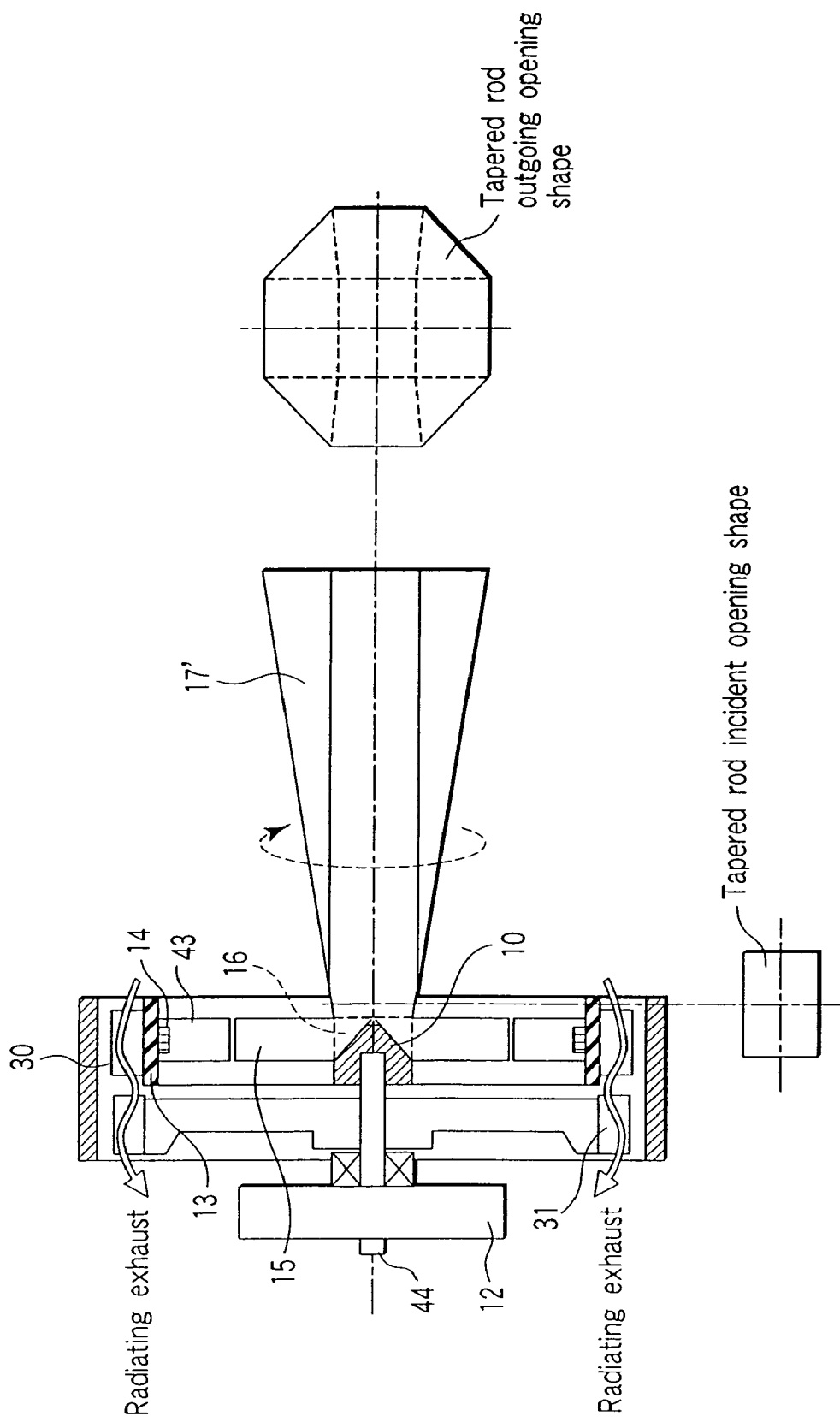
FIG. 29 is a diagram showing a structure of an illumination apparatus according to a seventh embodiment of the present invention.

In FIG. 9 through FIG. 12, it is assumed that there are the plurality of tapered rods 17. However, a structure of the present embodiment shown in FIG. 29 shows a case in which a single tapered rod is provided. Namely, the point that the LED 14 and the parallel rod 43 are each structured by being integrated is in the same way as in the structural example described in FIG. 27, and in the present embodiment as well, one light guiding member is formed due to the parallel rod 15 and the reflecting prism 16 being connected to one another, and the light guiding member is structured as a set with the other similar light guiding member facing one another. These two light guiding members are joined together to form an integrated optical member in which the outgoing openings of the light guiding members are joined together and formed to be substantially the same surface area as that of the incident opening of the single tapered rod 17' which is the second optical member. Further, in this example, the integrated optical member rotates at a high-speed, and makes the LED 14, corresponding to the parallel rod 43 which the incident opening of the parallel rod 15 faces, emit, and fetches the light emitted from the outgoing opening of the parallel rod 43 at a good timing by the parallel rod 15, and refracts the direction of the light by the reflecting prism 16, and guides the light to the tapered rod 17' serving as the second optical member. Namely, the light guided to the tapered rod 17' is light in which the light from two of the parallel rods 15 and two of the reflecting prisms 16 facing each other are simultaneously synthesized.

The incident opening of the tapered rod 17' in this example is a rectangular shape in which the outgoing opening of the reflecting prisms 16 are joined together. However, the shape of the outgoing opening of the tapered rod 17' is an odd-shaped tapered rod forming an octagon as shown in the drawing. In accordance with such a shape, because the locus shape of the outgoing opening and the outgoing opening shape of the rotatable tapered rod 17 in the other embodiments described above can be made to be the substantially same, illumination light having a substantially uniform light quantity distribution in the locus illuminated shape of the tapered rod outgoing opening obtained by rotation can be obtained. It goes without saying that the shape of the tapered rod outgoing opening is preferably a round shape around the rotating shaft. However, in consideration of the workability of the tapered rod, the shape of the tapered rod outgoing opening is made to be the octagon in this example. Because the structures and the effects other than these are the same as in the aforementioned embodiments, description thereof will be described.

Because the illumination light which is a round shape and in which illumination unevenness is little and the uniformity is high can be obtained from the outgoing opening of the tapered rod 17', when the illumination light is applied to a projection display apparatus such as a projector, as a structure of an illumination optical system, the illumination optical system can be structured by, not the Kohler illumination method, but the critical illumination method. In the structures in FIG. 9 through FIG. 12, because the locus illuminated shape is formed by the plurality of tapered rods 17, in the obtained illumination, there are cases in which, quantity of light at periphery falls short, and variations in quantity of light of the illumination light arise at the portion where the outgoing light cannot be obtained between the tapered rods. In this case, the Koehler illumination method solves these problems, and good illumination can be achieved.

In the present embodiment, provided that an inner surface reflection type tubulous optical element (such as an integrator rod or a pipe tunnel) for transforming a shape such that the illumination light which is a round shape and in which the uniformity is high, from the outgoing opening of the tapered rod 17', is immediately thereafter transformed from the round shape into a rectangular shape which is the same as that of the aspect of the display device 37 to which the projection display apparatus is applied, is used, it is possible to structure the illumination system guiding the circular illumination light to the incident surface of the display device 37 without waste.

Eighth Embodiment

Figure 30:
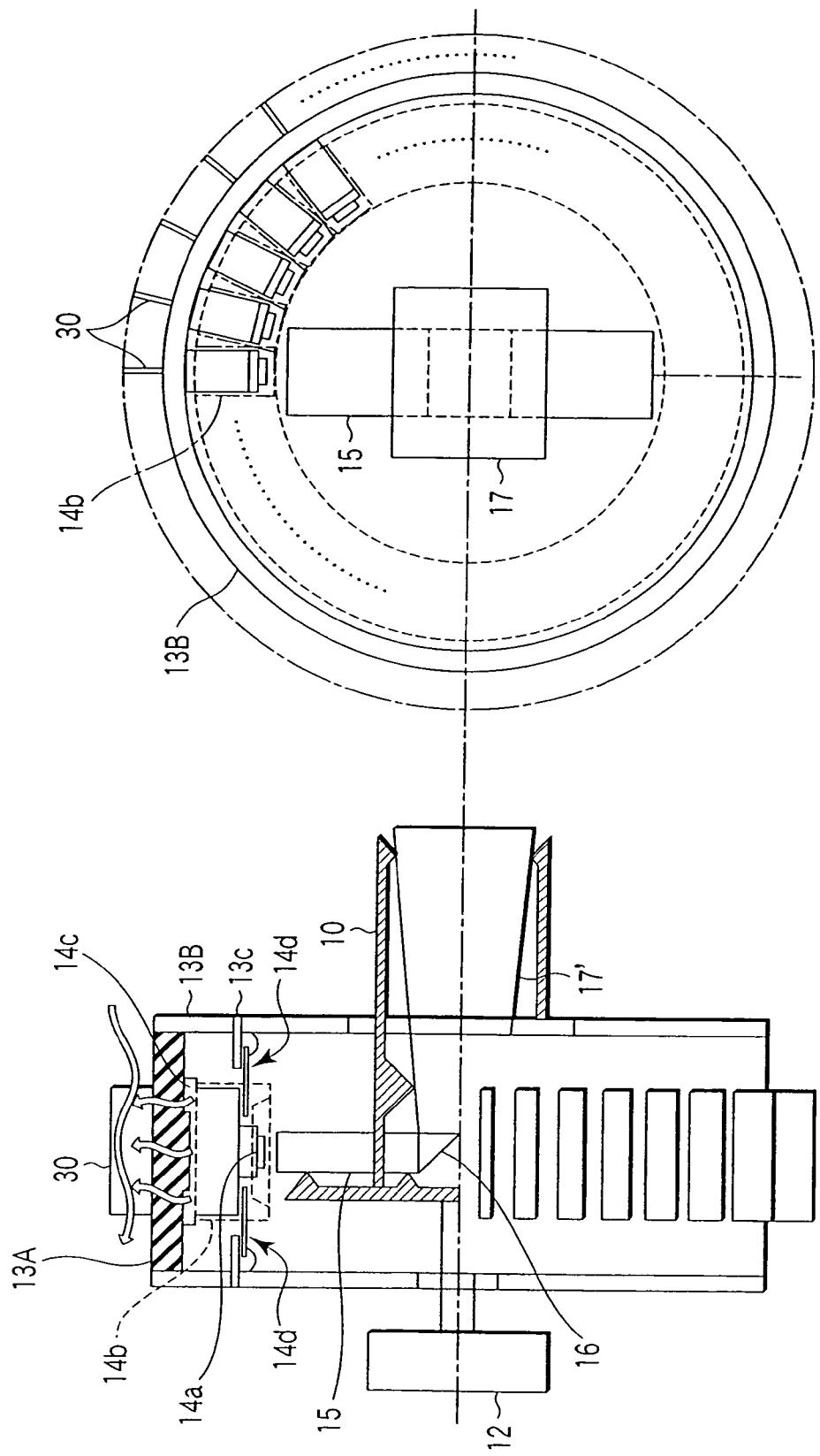
FIG. 30 is a diagram showing a structure of an illumination apparatus according to an eighth embodiment of the present invention.

Next, a modified example according to the radiation described in the first embodiment will be described as an eighth embodiment of the present invention. FIG. 30 is a diagram showing a structure of an illumination apparatus when the LED 14 is mounted at the inner surface of a cylinder. In the illumination apparatus, in the same way as in the seventh embodiment, one light guiding member is formed due to the parallel rod 15 and the reflecting prism 16 being connected to each other, and the light guiding member is made to be a set with the other similar light guiding member facing each other, and these two light guiding members are joined together to form an integrated optical member in which the outgoing openings of the light guiding members are joined together and formed to be substantially the same surface area as that of the incident opening of the single tapered rod 17' which is the second optical member. Further, such an optical member is attached to the rod holder 10 which is a rotatable holder, and is rotated by the rotating motor 12 serving as a driving section, and the plurality of the LEDs 14 serving as illuminants which are arranged at the internal circumference of an LED holding ring 13A formed so as to be a drum shape are successively lit in accordance with rotation of the light guiding rod member 11.

The LED 14 is structured due to an LED light-emitting chip 14a being enclosed in an LED resin package 14b. In this case, the LED chip 14a is mounted on a copper LED cooling core 14c in the LED light-emitting resin package 14b, and as shown by the arrows extending from the lower side to the upper side in the illustration, heat generated in accordance with light-emitting of the LED light-emitting chip 14a is efficiently transmitted to the LED holding ring 13A side. Further, the radiating plate 30 is provided at the outer circumference of the LED holding ring 13A, and as shown by the arrow extending from the right side to the left side in the illustration, due to air being blown by an unillustrated air blowing mechanism, the heat propagated from the LED 14 is radiated.

Note that the LED holding ring 13A is held between two of disc-like substrates 13B in which various control circuits and LED driving circuits are installed, and LED electrodes 14d are mounted at the substrate 13B, and are soldered with an unillustrated wiring on the FPC 13C electrically connected to an unillustrated wiring on the substrate 13B. Further, as shown in FIG. 27, it goes without saying that the optical member may be structured such that the parallel rod 15 and the reflecting prism 16 are integrated, and the tapered rod 17 is separately provided.

Figure 31A:
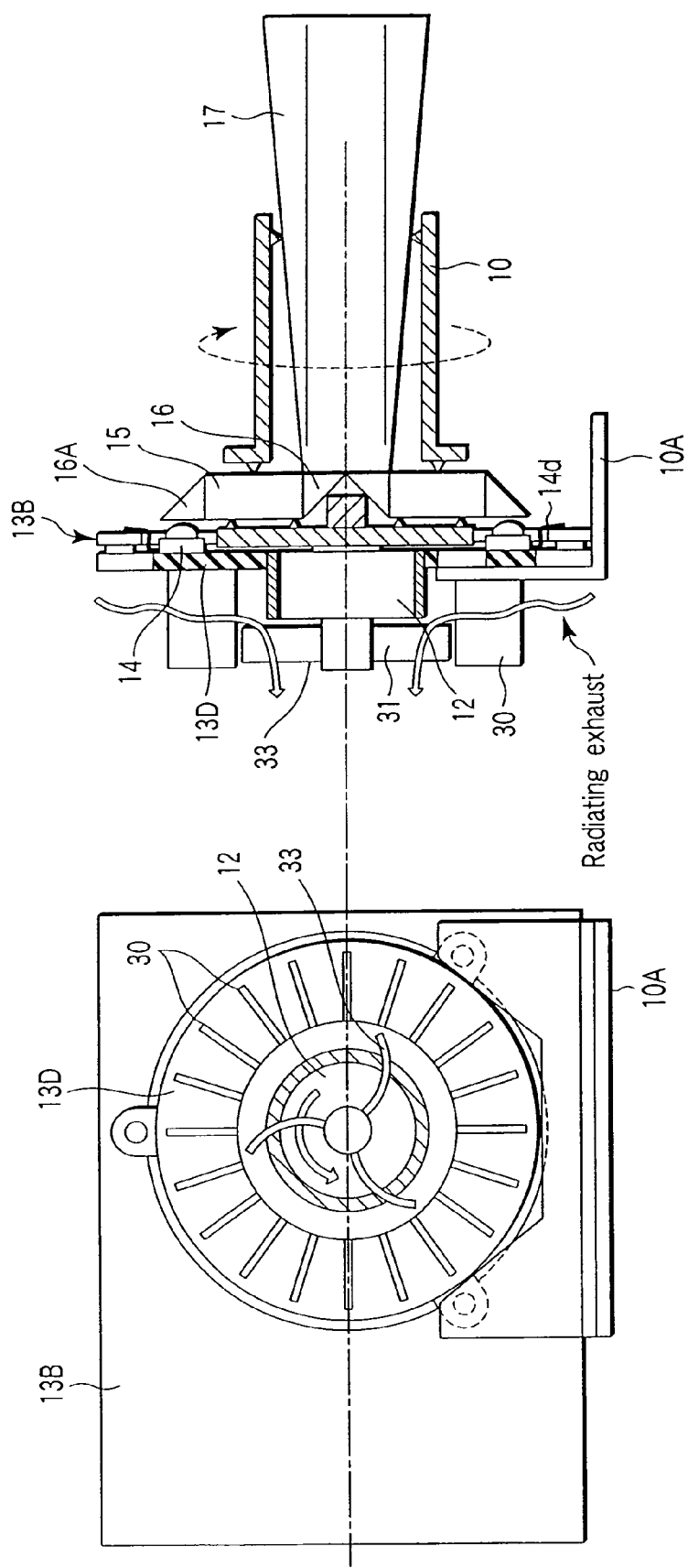
FIG. 31A is a diagram showing a structure of a modified example of the illumination apparatus according to the eighth embodiment.

FIG. 31A and FIG. 31B are drawings showing a structure of the illumination apparatus when the LED 14 is mounted on the disc. In the illumination apparatus, the optical member, in which the tapered rod 17 is commonly provided and an L-shaped optical surface is formed from two of the parallel rods 15 and two of the reflecting prisms 16, is attached to the rod holder 10 which is a rotatable holder, and is rotated by the rotating motor 12 serving as a driving section, and the plurality of the LEDs 14 serving as illuminants which are arranged at the same circumference of the LED holding disc 13D are successively lit in accordance with the rotation of the light guiding rod member 11. Note that, in this case, a reflecting prism 16a receiving the light from the LED 14 and reflecting the light to the incident surface of the parallel rod 15 is provided at the incident side of the parallel rod 15. Further, the widths of the reflecting prisms 16, 16a, and the parallel rod 15 are a width which can receive the light from two of the LEDs adjacent one another. However, it goes without saying that the widths are not limited thereto.

The radiating plates 30 are each attached to the rear surfaces at the positions where the respective LEDs 14 of the LED holding disk 13D are mounted. Further, the radiating fan 31 is attached to the rotating shaft of the rotating motor 12. Here, the radiating fan 31 is structured due to a plurality of fins 33 being attached at a predetermined interval, so as to have an angle in which a direction of the radiating exhaust is directed toward the rotating motor 12 side, on the peripheral surface of the rotating shaft of the rotating motor 12. Accordingly, at the same time when the optical member is rotated by the rotating motor 12, the radiating fan 31 rotates, and as shown by the arrow, it is possible to exhaust the air contacting with the radiating plate 30. Note that the LED holding disc 13D is held by being attached to the unit holder 10A, and the substrate 13B in which various control circuits and LED driving circuits are installed is attached to the LED holding disc 13D by the screws. Further, the LED electrode 14d is soldered with an unillustrated wiring on the substrate 13B.

Figure 32:
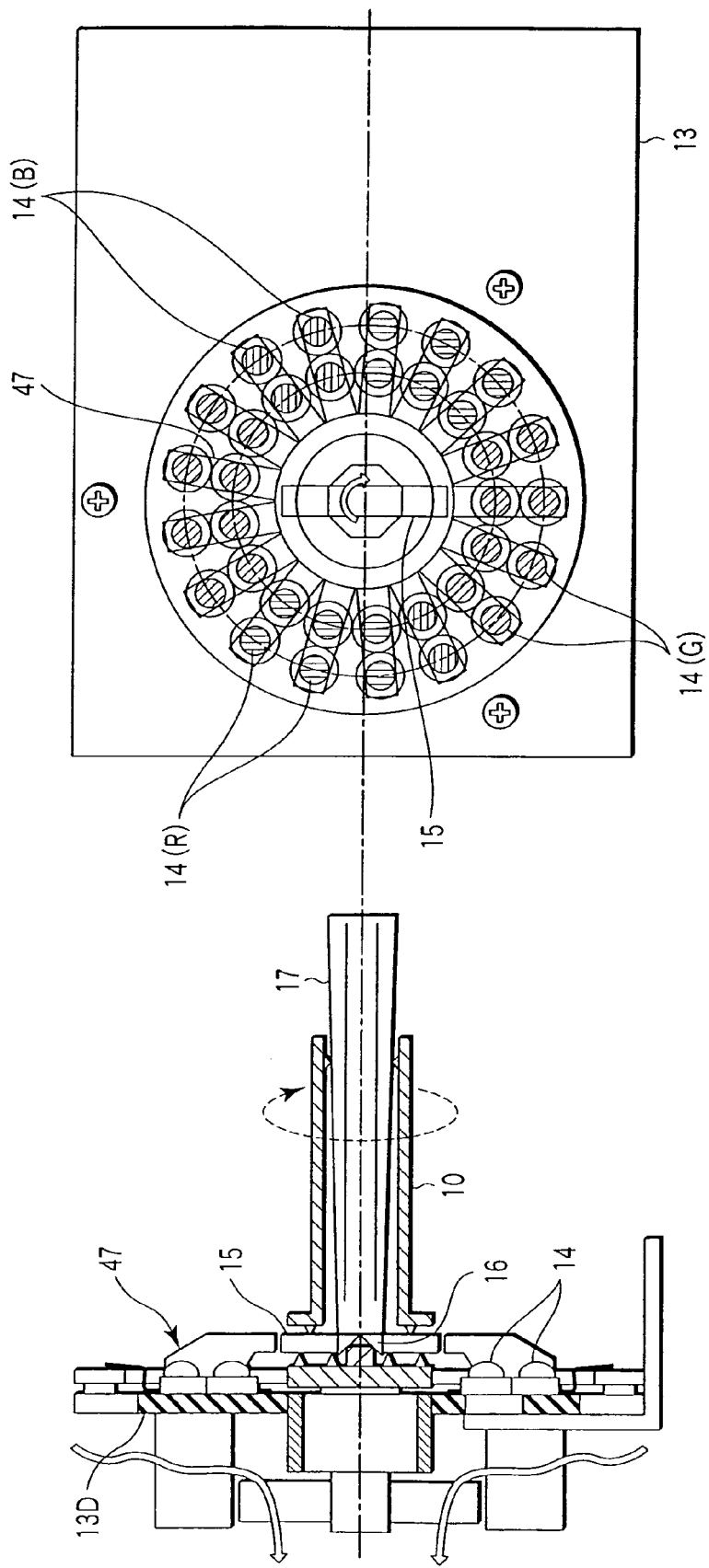
FIG. 32 is a diagram showing a structure of another modified example of the illumination apparatus according to the eighth embodiment.

Further, FIG. 32 is a diagram showing a modified example of the illumination apparatus of FIG. 31A and FIG. 31B. This is the example in which the plurality of LEDs 14 serving as illuminants are arranged on the two circumference on the LED holding disc 13D. In this case, a condensing cover 47 is used as a light guiding member for guiding diffused light to the parallel rod 15 from two to the adjacent LEDs 14 which are one from each circumference which is adjacent to one another. The condensing cover 47 is structured so as to be separated from the optical member in order to be not rotated along with the optical member formed from the parallel rod 15, the reflecting prism 16, and the tapered rod 17, and is attached so as to cover the two LEDs 14. The condensing cover 47 is a hollow structure, and the inner surface thereof is mirror-coated, and the light from the two corresponding LEDs 14 is efficiently reflected toward the incident surface of the parallel rod 15.

Figure 33:
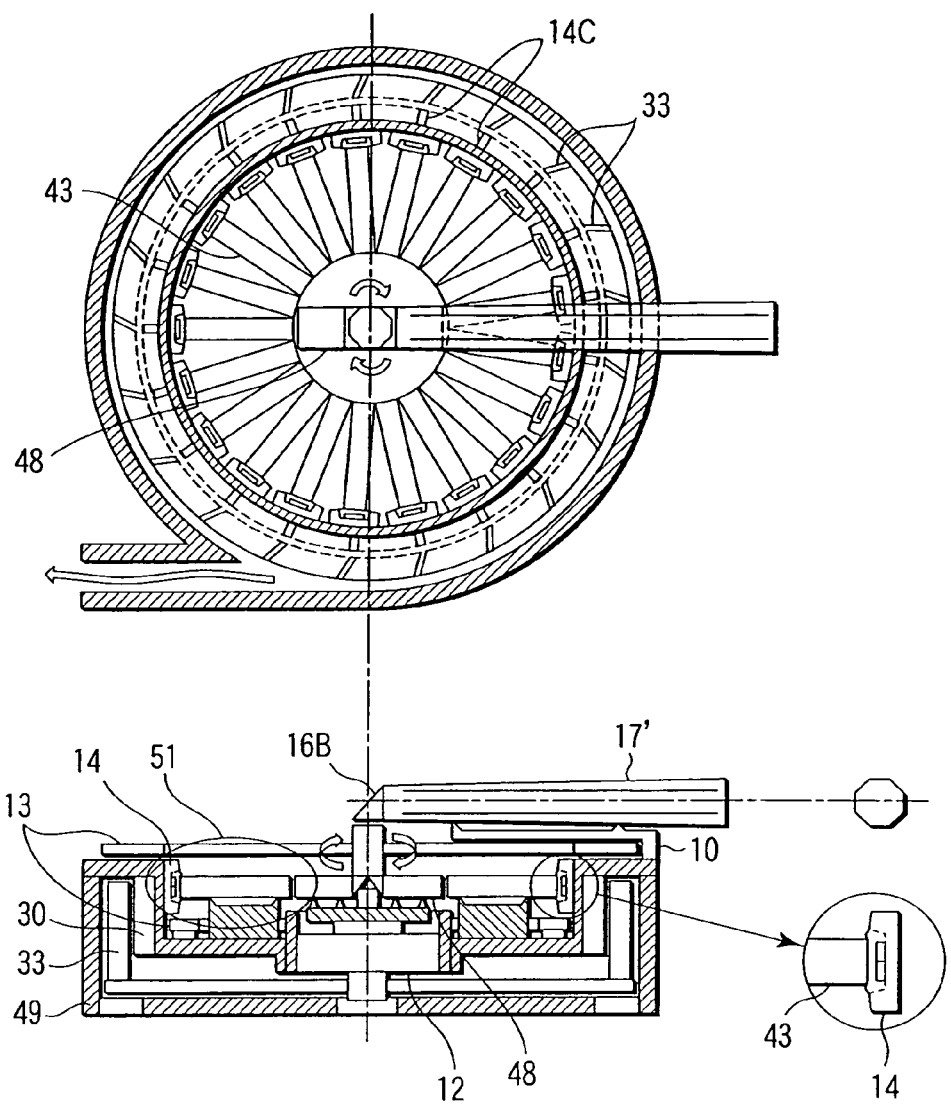
FIG. 33 is a diagram showing a structure of even other modified example of the illumination apparatus according to the eighth embodiment.

FIG. 33 is a modification of the structure of FIG. 27 in the sixth embodiment. Namely, in FIG. 27, a rotating light guiding unit 48 in which the respective outgoing openings of two of the light guiding members in which the parallel rod 15 and the reflecting prism 16 are each connected are joined together is structured, and an optical member is structured due to the joined outgoing opening and the incident opening of a single tapered rod 17' which is the second optical member being disposed so as to face one another. In contrast, in this modified example, due to a reflecting prism 16B whose reflecting surface is mirror-coated being disposed between the joined outgoing opening of the rotating light guiding unit 48 and the incident opening of the tapered rod 17', an optical path is refracted. In this case, it is structured such that the only rotating light guiding unit 48 rotates.

Figure 34:
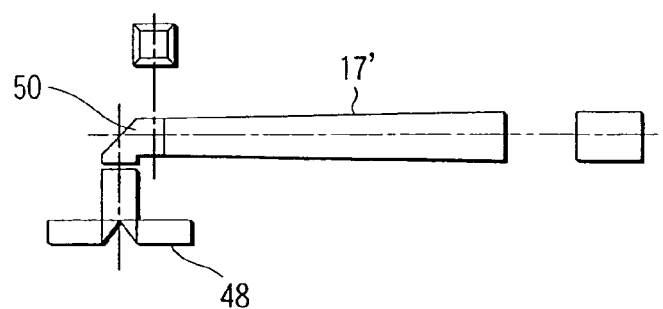
FIG. 34 is a diagram showing a main portion of the modified example of the illumination apparatus of FIG. 33.

Note that, as shown in FIG. 34, it goes without saying that a light pipe 50 in which the inner surface thereof is mirror-coated may be disposed so as to be inserted between the joined outgoing opening of the rotating light guiding unit 48 and the tapered rod 17' in place of the reflecting prism 16B.

Further, in the illumination apparatus of FIG. 33, the radiating fan 31 which is a radiation exhaust member rotated along with the rotating light guiding unit 48 by the rotating motor 12 is formed from cage-shaped fins 33 attached to the rotating shaft of the rotating motor 12, and is structured as a centrifugal fan, i.e., a scirocco fan, in which a direction of radiation exhaust is directed toward the side opposite to the rotating motor 12 (circumferential direction). Further, in this case, the radiating fan 31 is accommodated in a base 49 in which an air flow-path toward merely one direction is formed. In accordance with such a structure, a radiating effect is improved due to large gas quantity being provided, and making the apparatus silent is possible.

Ninth Embodiment

Figure 35:
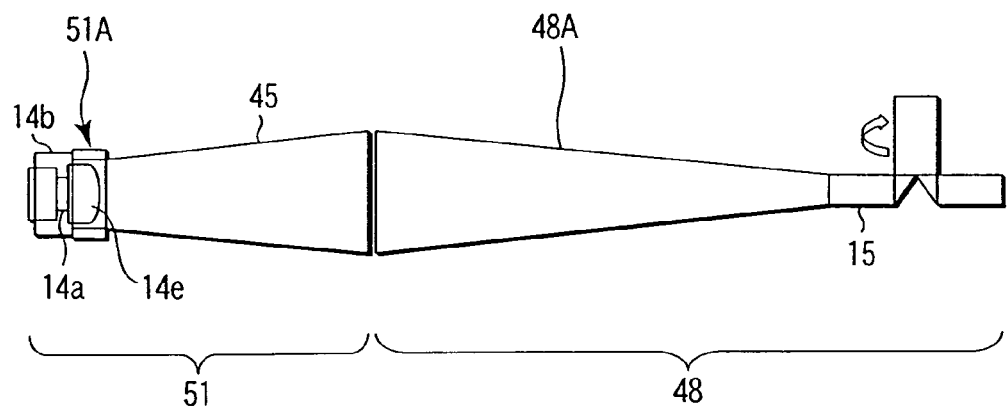
FIG. 35 is a diagram showing a structure of a main portion of an illumination apparatus according to a ninth embodiment of the present invention.

Next, a modified example of the light-emitting unit 51, which has the parallel rod 43 or the tapered rod 45 and which serves as the light guiding member for guiding diffused light from the LED 14 to the incident surface which is the end surface of the parallel rod 15 of the rotating light guiding unit 48 as in the sixth through eighth embodiments, will be described as a ninth embodiment of the present invention. Namely, FIG. 35 is a diagram showing one portion of the rotating light guiding unit 48 and the light-emitting unit 51 according to one LED 14. The LED 14 is structured due to a dome lens 14e being disposed at the front surface of the LED resin package 14b in which the LED light-emitting chip 14a is enclosed. In the structure shown in the drawing, in the light-emitting unit 51, an inner surface reflecting pipe 51A surrounding the dome lens 14e is disposed at the front surface of the LED resin package 14b, and a tapered rod 45 is disposed at the front surface thereof. The tapered rod 45 is fixedly installed in a direction in which the taper thereof gradually becomes larger from the end portion at the LED 14 side toward the end portion at the rotating light guiding unit 48 side. Accordingly, the ray generated from the LED light-emitting chip 14a in the LED resin package 14b is converted such that an NA thereof is made small while total reflections are repeated at the inner surface of the tapered rod 45, and is emitted. Note that it goes without saying that not only a dense optical element satisfying the conditions for total reflection such as the tapered rod 45, but also a hollow pipe shaped optical element whose inner surface is reflection-coated may be used.

Further, in the rotating light guiding unit 48, a tapered rod 48A is structured at the incident end side of the parallel rod 15. The tapered rod 48A is provided in a direction in which the taper thereof gradually becomes smaller from the end portion at the outgoing surface side of the tapered rod 45 toward the end portion at the tapered rod 15 side. Namely, the size and the shape of the incident surface are made to match with the size and the shape of the outgoing surface of the tapered rod 45 of the light-emitting unit 51, and the size and the shape of the outgoing surface thereof are made to match with the size and the shape of the incident surface of the parallel rod 15.

In such a structure, there is a function which attenuates a phenomenon that the ray retrogresses to the incident side in the tapered rod inversely provided (inverted tapered rod) 48A to which the light is guided at the next step due to the ray from the LED light-emitting chip 14a being once transformed into the ray whose NA is small by the tapered rod 45, and there is the effect that many of the components of the ray incident in the inverted tapered rod 48A are emitted.

Figure 36:
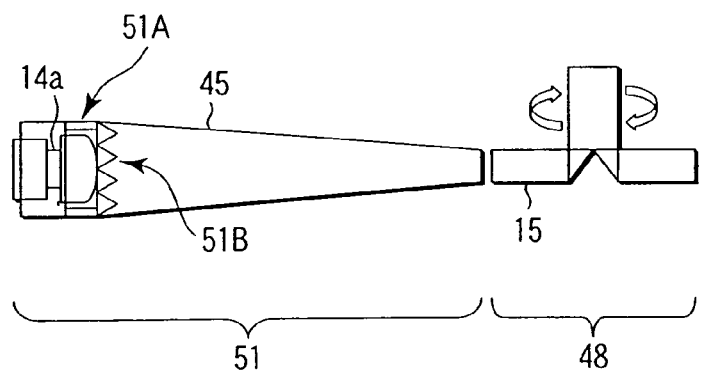
FIG. 36 is a diagram showing a main portion of a modified example of the illumination apparatus of FIG. 35.

FIG. 36 is a diagram showing a modified example of the structure of FIG. 35. In the modified example, the tapered rod 45 is fixedly disposed in a direction in which the taper thereof gradually becomes smaller from the end portion at the LED 14 side toward the end portion at the parallel rod 15 side of the rotating light guiding unit 48. Further, in this case, a ray inclination converting section 51B is structured at the incident surface of the tapered rod 45. The ray inclination converting section 51B is structured from a microprism array formed from a plurality of triangular surfaces as shown in the drawing, and has an function converting an inclination so as to make an NA of the ray small. In such a structure as well, there is a function which attenuates a phenomenon that the ray retrogresses to the incident side in the tapered rod 45 which is inversely disposed due to the ray from the LED light-emitting chip 14a being once transformed into the ray whose NA is small by the ray inclination converting section 51B, and there is an effect in which plenty of components of the ray incident in the inverted tapered rod 45 are emitted. Moreover, the tapered rod 48A of the rotating light guiding unit 48 as shown in FIG. 35 can be eliminated, and an attempt can be made to make the apparatus compact.

Figure 37:
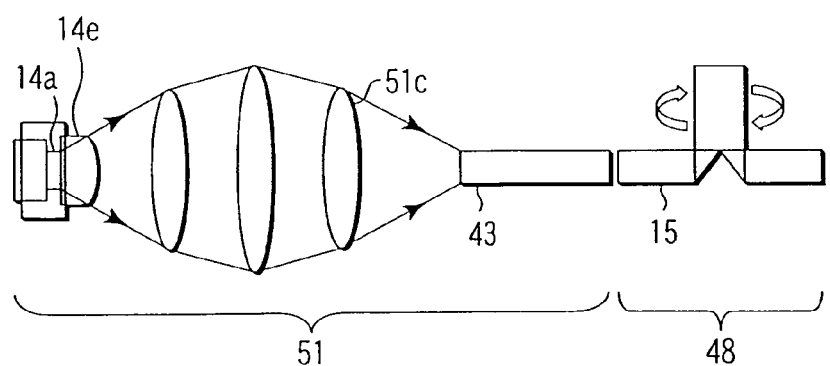
FIG. 37 is a diagram showing a main portion of another modified example of the illumination apparatus of FIG. 35.

FIG. 37 is a diagram showing the other modified example of the structure of FIG. 35. In this modified example, the same function is achieved by a plurality of lenses 51C in place of the tapered rods 45, 48A shown in FIG. 35. In this way, even if a plurality of lenses 51C are used as well, the same effect can be obtained.

Tenth Embodiment

Next, a structure of the LED which can be used as an illuminant of the illumination apparatus will be described as a tenth embodiment of the present invention. The structure shown in FIG. 38 corresponds to the structure of FIG. 36, and the portion corresponding to the fixed light-emitting unit 51 is structured from the LED 14 having a light guiding cap 14f and the tapered rod which inversely disposed (inverted tapered rod) 45. Therefore, the ray generated from the LED light-emitting chip 14a in the LED resin package 14b is emitted as a ray whose NA is relatively small by the light guiding cap 14f, and is incident to the inverted tapered rod 45.

Figure 39:
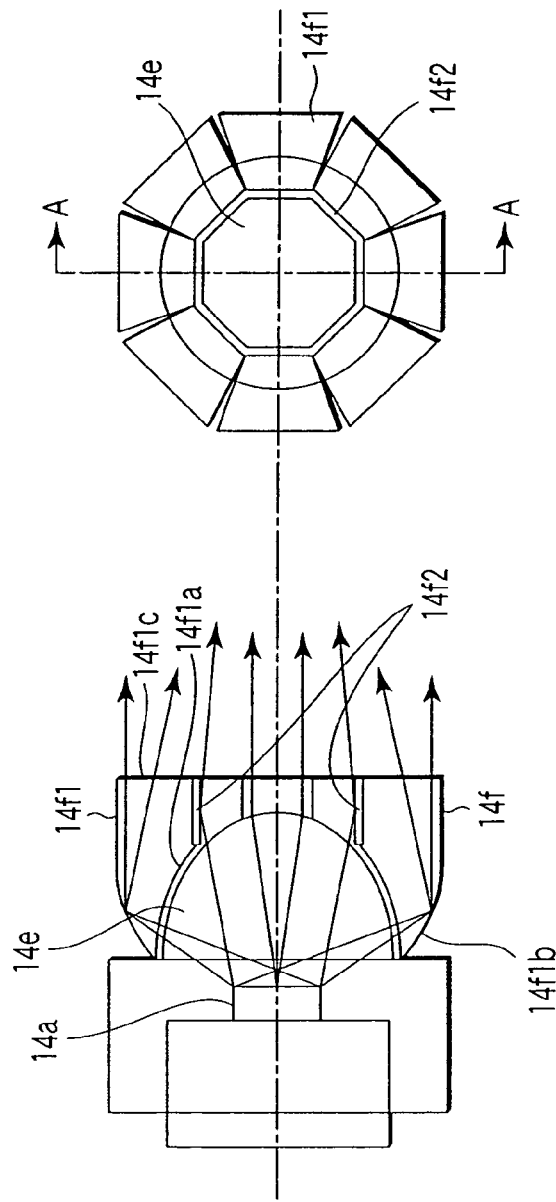
FIG. 39 is a diagram showing the details of a light guiding cap in FIG. 38.

As shown in FIG. 39, the light guiding cap 14f is structured so as to cover the dome lens 14e in the general LED 14, and a plurality of odd-shaped prisms 14/1 having a curve shape at the exterior side are structured so as to be arranged in a concentric circle shape with respect to the dome lens 14e. Namely, the odd-shaped prism 14/1 is light guiding prism which functions as an NA converting section making an NA small and which is disposed in the vicinity of the LED light-emitting chip 14a in the positional relationship which is point-symmetrical with respect to the center of the LED 14. The odd-shaped prism 14/1 has an incident surface 14/1a to which the outgoing light from the LED light-emitting chip 14a is incident, a reflecting surface 14/1b at which light incident from the incident surface 14/1a is reflected, and in which the light is guided in a predetermined direction in the odd-shaped prism 14/1, and an outgoing surface 14/1c from which the light guided at the reflecting surface is emitted. Further, the respective odd-shaped prisms 14/1 are structured so as to generate air layers. Moreover, at the rear side of the reflecting surface 14/1b, i.e., at surfaces which face the other odd-shaped prisms 14/1 among the surfaces structuring the odd-shaped prism 14/1 and which are other than the incident surface 14/1a, the reflecting surface 14/1b, and the outgoing surface 14/1c, as shown in the drawing, high-efficiency reflective coating 14/2 is applied to one portion thereof, and ray from any of region sandwiching the reflective coating 14/2 can be reflected to the same region. Accordingly, the ray at the exterior generated from the LED light-emitting chip 14a is repeatedly total-reflected or regular-reflected at the inner surface by the odd-shaped prism 14/1, and is emitted to the front. Further, the ray at the interior from the LED light-emitting chip 14a is emitted to the front by refraction of the dome lens 14e or the regular reflection of the reflective coating 14/2 at the dome lens side of the odd-shaped prism 14/1. Note that the reflecting surface 14/1b may be reflection-coated in order to exactly reflect light.

In this way, the ray emitted from the light guiding cap 14f is incident to the incident surface of the inverted tapered rod 45 separated by a joining portion or an extremely narrow gap. Further, the luminous flux is squeezed by the tapered rod 45, and is incident to the rotating light guiding unit 48. This function is the same as that described in FIG. 35 through FIG. 37.

Figure 38:
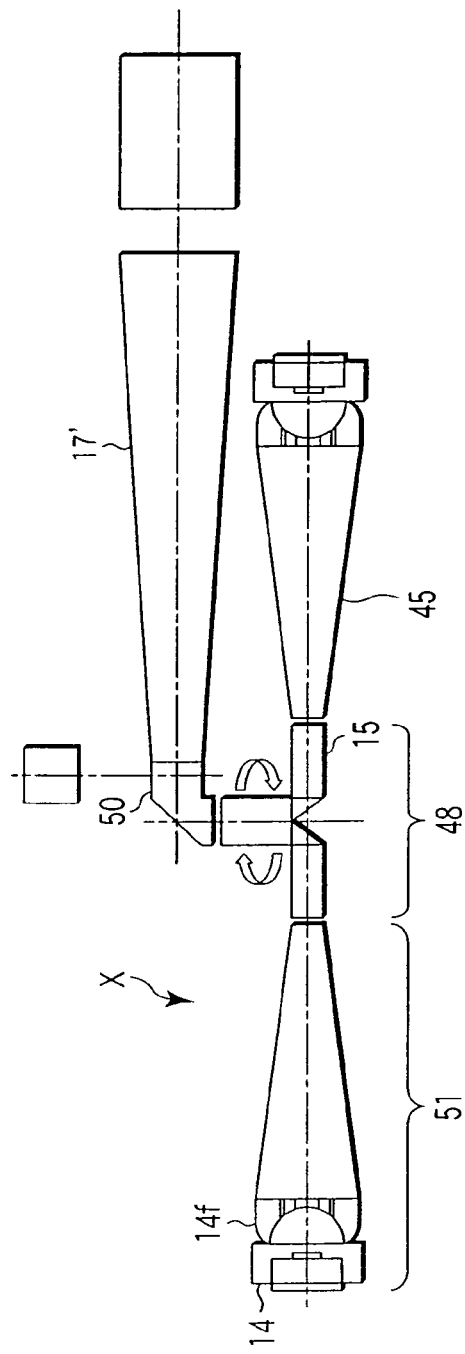
FIG. 38 is a diagram showing a structure of a main portion of an illumination apparatus according to a tenth embodiment of the present invention.

FIG. 40 shows a diagram viewed from a direction of X in FIG. 38. The plurality of light-emitting units 51 are arranged in a concentric radial pattern, and it is structured such that the light is incident to the rotating light guiding unit 48 which is rotating. Provided that a gap between the incident opening surface of the rotating light guiding unit 48 and the outgoing opening surface of the light-emitting unit 51 is made small so as to be the limit to an extent in which they do not mechanically interfere with one another, it is preferable in the point that the ray is guided without leakage. Therefore, in the drawing of FIG. 40, the respective opening shapes are processed so as to be concentric circles with respect to the rotation center of the rotating light guiding unit 48.

Note that the odd-shaped prism 14/1 of the light guiding cap 14f and the tapered rod 45 may be naturally, not only dense optical elements satisfying the conditions for total reflection, but also hollow pipe shapes whose inner surfaces are reflection-coated.

Further, provided that the image projection apparatus in accordance with the illumination apparatus of the present invention is applied to the components on which an image is projected in a photographic exposure apparatus, a color copy apparatus, a color printer, a rewritable electric paper recording apparatus, or the like, color adjustment is easy, and the image projection apparatus can be effective image forming means.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An illumination apparatus illuminating an objective illumination region, comprising:
  a plurality of illuminants having light-emitting surfaces radiating diffused light, and arranged on a circumference of a circle;
  a plurality of first optical members each including a first incident end surface on which the diffused light radiated from a light-emitting surface is made incident, a first reflecting surface configured to reflect and guide the diffused light incident from the first incident end surface, and a first outgoing end surface configured to output the guided diffused light, and each being disposed to be fixed to a respective one of the plurality of illuminants; and a second optical member configured to rotate around an axis running through the center of the circumference as a rotation center, and guide the diffused light output from the plurality of first outgoing end surfaces, to illuminate the objective illumination region.

2. The illumination apparatus according claim 1, wherein a gap between adjacent ones of the plurality of outgoing end surfaces in its circumferential direction is narrower than a gap between adjacent ones of the plurality of light emitting surfaces in its circumferential direction.

3. The illumination apparatus according claim 2, wherein adjacent sides of adjacent ones of the plurality of outgoing end surfaces are In contact with each other.

4. The illumination apparatus according claim 2, wherein the first optical member is a parallel rod, and the first incident end surface and the first outgoing end surface are identical to each other in terms of size and shape.

5. The illumination apparatus according claim 2, wherein the first optical member is a tapered rod, and the first outgoing end surface is larger in size than the first incident end surface.

6. The illumination apparatus according claim 2, wherein the first optical member is an inverted tapered rod, and the first outgoing end surface is smaller in size than the first incident end surface.

7. The illumination apparatus according claim 1, wherein the first optical member is a solid rod, and the diffused light made incident from the first incident end surface is guided by total-reflecting on the first reflecting surface.

8. The illumination apparatus according claim 1, wherein the first optical member is a solid rod, and the diffused light made incident from the first incident end surface is guided by reflecting on a reflective coating applied on the first reflecting surface.

9. The illumination apparatus according claim 1, wherein the second optical member includes a second incident end surface on which the diffused light radiated from the first outgoing end surface is made incident, a second reflecting surface configured to reflect and guide the diffused light incident from the second incident end surface, and a second outgoing end surface configured to output the guided diffused light; and the first outgoing end surface is substantially the same as the second incident end surface in size and shape.

10. A projector comprising:

an illumination apparatus illuminating an objective illumination region, comprising:

a plurality of illuminants having light-emitting surfaces radiating diffused light, and arranged on a circumference of a circle;

a plurality of first optical members each including a first incident end surface on which the diffused light radiated from a light-emitting surface is made incident, a first reflecting surface configured to reflect and guide the diffused light incident from the first incident end surface, and a first outgoing end surface configured to output the guided diffused light, and each being disposed to be fixed to a respective one of the plurality of illuminants; and a second optical member configured to rotate around an axis running through the center of the circumference as a rotation center, and guide the diffused light output from the plurality of first outgoing end surfaces, to illuminate the objective illumination region;

a display device disposed in the objective illumination region; and a projection lens configured to project the diffused light modulated by the display device.

\* \* \* \* \*